(12) United States Patent
Novick et al.

(10) Patent No.: US 8,909,199 B2
(45) Date of Patent: *Dec. 9, 2014

(54) VOICEMAIL SYSTEMS AND METHODS

(71) Applicant: Apple Inc., Cuperitno, CA (US)

(72) Inventors: Gregory Novick, Santa Clara, CA (US); Henri C. Lamiraux, Menlo Park, CA (US); Jeremy A. Wyld, San Jose, CA (US); Jeffrey Bush, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/784,537

(22) Filed: Mar. 4, 2013

(65) Prior Publication Data

US 2013/0183942 A1     Jul. 18, 2013

Related U.S. Application Data

(63) Continuation of application No. 11/620,716, filed on Jan. 7, 2007, now Pat. No. 8,391,844.

(51) Int. Cl.
*H04M 11/10*     (2006.01)
*H04M 3/533*     (2006.01)
*H04M 1/725*     (2006.01)

(52) U.S. Cl.
CPC .......... *H04M 3/533* (2013.01); *H04M 2203/31* (2013.01); *H04M 2203/256* (2013.01); *H04M 2250/22* (2013.01); *H04M 3/53333* (2013.01); *H04M 1/7255* (2013.01)
USPC ......................... 455/413; 455/412.1; 379/67.1

(58) Field of Classification Search
CPC . H04M 3/533; H04M 3/53333; H04M 3/537; H04M 1/7255; H04M 2203/45
USPC .................... 455/412.1–413; 379/67.1–88.28
See application file for complete search history.

(56) References Cited

U.S. PATENT DOCUMENTS

| 4,837,798 | A | 6/1989 | Cohen et al. |
| 4,935,954 | A | 6/1990 | Thompson et al. |
| 4,972,462 | A | 11/1990 | Shibata |

(Continued)

FOREIGN PATENT DOCUMENTS

| EP | 0 845 894 A2 | 6/1998 |
| EP | 1 001 588 A2 | 5/2000 |

(Continued)

OTHER PUBLICATIONS

Arons, B., "The Audio-Graphical Interface to a Personal Integrated Telecommunications System," Massachusetts Institute of Technology, Department of Architecture Master Thesis, Jun. 1984, 88 pages.

(Continued)

*Primary Examiner* — George Eng
*Assistant Examiner* — Marcus Hammonds
(74) *Attorney, Agent, or Firm* — Morrison & Foerster LLP

(57) ABSTRACT

Systems, methods and computer readable media for providing or managing or using voicemails are described. In one embodiment, a method includes receiving, at a first data processing system, data representing an expiration time of a voicemail left for a user of the first data processing system and storing the data representing the expiration time for later use by the first data processing system. Systems, media, and other methods are also described.

19 Claims, 19 Drawing Sheets

(56) References Cited

U.S. PATENT DOCUMENTS

| | | | |
|---|---|---|---|
| 5,003,577 A | 3/1991 | Ertz et al. | |
| 5,164,982 A | 11/1992 | Davis et al. | |
| 5,283,818 A | 2/1994 | Klausner et al. | |
| 5,333,266 A | 7/1994 | Boaz et al. | |
| 5,390,236 A | 2/1995 | Klausner et al. | |
| 5,524,140 A | 6/1996 | Klausner et al. | |
| 5,568,540 A | 10/1996 | Greco et al. | |
| 5,572,576 A | 11/1996 | Klausner et al. | |
| 5,682,475 A | 10/1997 | Johnson et al. | |
| 5,708,659 A | 1/1998 | Rostoker et al. | |
| 5,724,406 A | 3/1998 | Juster | |
| 5,742,736 A | 4/1998 | Haddock | |
| 5,802,466 A | 9/1998 | Gallant et al. | |
| 5,912,951 A | 6/1999 | Checchio et al. | |
| 5,933,477 A | 8/1999 | Wu et al. | |
| 6,226,533 B1 | 5/2001 | Akahane | |
| 6,359,970 B1 | 3/2002 | Burgess | |
| 6,502,194 B1 | 12/2002 | Berman et al. | |
| 6,538,665 B2 | 3/2003 | Crow et al. | |
| 6,542,584 B1 | 4/2003 | Sherwood et al. | |
| 6,546,262 B1 | 4/2003 | Freadman | |
| 6,912,407 B1 | 6/2005 | Clarke et al. | |
| 6,928,149 B1 | 8/2005 | Panjwani et al. | |
| 6,970,915 B1 | 11/2005 | Partovi et al. | |
| 7,194,611 B2 * | 3/2007 | Bear et al. | 713/1 |
| 7,218,920 B2 | 5/2007 | Hyon | |
| 7,359,493 B1 | 4/2008 | Wang et al. | |
| 7,359,671 B2 | 4/2008 | Richenstein et al. | |
| 7,558,381 B1 | 7/2009 | Ali et al. | |
| 7,783,283 B2 | 8/2010 | Kuusinen et al. | |
| 2002/0077082 A1 | 6/2002 | Cruickshank | |
| 2002/0165918 A1 | 11/2002 | Bettis | |
| 2003/0002632 A1 | 1/2003 | Bhogal et al. | |
| 2003/0095096 A1 | 5/2003 | Robbin et al. | |
| 2003/0128819 A1 | 7/2003 | Lee et al. | |
| 2003/0147512 A1 | 8/2003 | Abburi | |
| 2003/0187655 A1 | 10/2003 | Dunsmuir | |
| 2003/0224760 A1 | 12/2003 | Day | |
| 2003/0228863 A1 * | 12/2003 | Vander Veen et al. | 455/412.1 |
| 2003/0229616 A1 | 12/2003 | Wong | |
| 2004/0022373 A1 * | 2/2004 | Suder et al. | 379/88.11 |
| 2004/0048627 A1 | 3/2004 | Olvera-Hernandez | |
| 2004/0059790 A1 | 3/2004 | Austin-Lane et al. | |
| 2004/0062367 A1 | 4/2004 | Fellenstein et al. | |
| 2004/0136510 A1 | 7/2004 | Vander Veen | |
| 2004/0205151 A1 | 10/2004 | Sprigg et al. | |
| 2004/0224638 A1 | 11/2004 | Fadell et al. | |
| 2005/0031106 A1 | 2/2005 | Henderson | |
| 2005/0138305 A1 | 6/2005 | Zellner | |
| 2005/0140504 A1 * | 6/2005 | Marshall et al. | 340/480 |
| 2005/0148356 A1 | 7/2005 | Ferguson et al. | |
| 2005/0181770 A1 | 8/2005 | Helferich | |
| 2005/0195429 A1 | 9/2005 | Archbold | |
| 2005/0245243 A1 | 11/2005 | Zuniga | |
| 2005/0278297 A1 | 12/2005 | Nelson | |
| 2006/0053379 A1 | 3/2006 | Henderson et al. | |
| 2006/0072716 A1 | 4/2006 | Pham | |
| 2006/0074750 A1 * | 4/2006 | Clark et al. | 705/14 |
| 2006/0161872 A1 | 7/2006 | Rytivaara et al. | |
| 2006/0205432 A1 | 9/2006 | Hawkins et al. | |
| 2006/0234680 A1 | 10/2006 | Doulton | |
| 2006/0256934 A1 | 11/2006 | Mazor | |
| 2007/0116195 A1 | 5/2007 | Thompson et al. | |
| 2007/0136778 A1 | 6/2007 | Birger et al. | |
| 2007/0173233 A1 | 7/2007 | Vander Veen et al. | |
| 2007/0192403 A1 | 8/2007 | Heine et al. | |
| 2007/0207785 A1 | 9/2007 | Chatterjee et al. | |
| 2007/0260822 A1 | 11/2007 | Adams | |
| 2007/0274468 A1 | 11/2007 | Cai | |
| 2007/0286363 A1 | 12/2007 | Burg et al. | |
| 2008/0016575 A1 | 1/2008 | Vincent et al. | |
| 2008/0043943 A1 * | 2/2008 | Sipher et al. | 379/88.22 |
| 2008/0056459 A1 | 3/2008 | Vallier et al. | |
| 2008/0207176 A1 | 8/2008 | Brackbill et al. | |
| 2008/0242280 A1 | 10/2008 | Shapiro et al. | |
| 2009/0005012 A1 | 1/2009 | van Heugten | |

FOREIGN PATENT DOCUMENTS

| | | |
|---|---|---|
| EP | 1 047 251 A2 | 10/2000 |
| EP | 1 379 061 A2 | 1/2004 |
| EP | 1 432 219 A1 | 6/2004 |
| JP | 06 069954 | 3/1994 |
| JP | 09 018585 | 1/1997 |
| JP | 09 055792 | 2/1997 |
| JP | 2004 048804 | 2/2004 |
| KR | 2005 0083561 | 8/2005 |
| KR | 2006 0012730 | 2/2006 |
| WO | WO 99/16181 A | 4/1999 |
| WO | WO 00/44173 A1 | 7/2000 |
| WO | WO 03/003765 A1 | 1/2003 |
| WO | WO 03/084196 A1 | 10/2003 |
| WO | WO 2004/047415 A1 | 6/2004 |
| WO | WO 2004/057486 A1 | 7/2004 |
| WO | WO 2005/027472 A2 | 3/2005 |
| WO | WO 2005/027485 A1 | 3/2005 |
| WO | WO 2006/056822 A1 | 6/2006 |
| WO | WO 2007/002753 A2 | 1/2007 |

OTHER PUBLICATIONS

Cisco, "Cisco Unity Unified Messaging User Guide," Release 4.0(5), Cisco Systems, Inc., Apr. 14, 2005, 152 pages.

Cisco, "Installation Guide for Cisco Unity Unified Messaging with Microsoft Exchange 2003/2000 (with Failover Configured)," Release 4.0(5) Cisco Systems, Inc., Apr. 14, 2005, 152 pages.

Cisco "Operations Manager Tutorial, Cisco's IPC Management Solution," Cisco Systems, Inc., 2006, 256 pages.

Coleman, D., "Meridian Mail Voice Mail System Integrates Voice Processing and Personal Computing," Speech Technology, vol. 4, No. 2, Mar./Apr. 1988, 7 pages.

Northern Telecom, "Meridian Mail PC User Guide," 17 pages.

Schmandt, C. et al., "A Conversational Telephone Messaging System," IEEE Transactions on Consumer Electronics, Aug. 1984, vol. CE-30, 4 pages.

Schmandt, C. et al., "Phone Slave: A Graphical Telecommunications Interface," Proceeding of the SID, vol. 26/1, 1985, 4 pages.

Schmandt, C. et al., "Phone Slave: A Graphical Telecommunications Interface," Society for Information Display, 1984 International Symposium Digest of Technical Papers, Jun. 1984, San Francisco, CA, 4 pages.

Notice of Allowance dated Nov. 28, 2012, received in U.S. Appl. No. 11/620,716, 11 pages (Novick).

* cited by examiner

| Voicemails | | Sort By - Date | | |
|---|---|---|---|---|
| Name | Phone Number | | Date/Time | Length |
| – | 650-789-1234 | | Jan. 6, 2006 | 60 sec. |
| John | 408-996-1111 | | Mar. 1, 2006 | 40 sec. |
| ⁕ – | 301-438-0029 | | Jun. 1, 2006 | 30 sec. |

VOICEMAIL SYSTEMS AND METHODS

CROSS-REFERENCE TO RELATED APPLICATIONS

This is a continuation of U.S. application Ser. No. 11/620,716, filed Jan. 7, 2007, which is incorporated herein by reference in its entirety.

BACKGROUND OF THE INVENTION

Modern telephone systems, such as a land line telephone or a wireless cellular telephone, include the ability to leave a voice message for the owner or user of the telephone. Typically, a caller to the phone number of that phone will hear a voicemail greeting telling the caller to leave a message. After the greeting, the caller has the opportunity to leave a message which is recorded on a voicemail system. In certain embodiments, the voicemail is recorded locally on a storage device which is part of a telephone in the case of certain land line phones, or the voicemail may be recorded on a voicemail server maintained in the infrastructure of a public telephone carrier, such as AT&T or Verizon or Verizon Wireless.

These voicemails are recorded and maintained for later use by the owner or operator of the telephone device for which the voicemail account was established. For example, the user of the telephone device may connect to the voicemail server through a telephone call to the voicemail server to listen to one or more voicemails stored at the voicemail server. Current systems provide a very minimal user interface to the user with respect to the voicemails stored at the voicemail server. For example, on a typical wireless cellular telephone, the user is presented with a notification which indicates the number of voicemails. FIG. 1 shows an example of a display of a telephone device, such as a wireless cellular telephone. The display 10 includes an indication 11 which shows that there are two voicemails, which may be new voicemails not listened to by the user. The user must then obtain access to those voicemails by connecting to the voicemail server through a telephone call. During that phone call, the user is prompted to enter commands to cause playback of the voicemail messages. The playback sequence is constrained by the order in which the voicemails were recorded or received at the voicemail server. In other words, the user must access each voicemail one after another in a series based upon the time of receipt of the voicemail.

This user interface prevents the user from randomly picking and choosing voicemails for listening and forces the user to go through each and every voicemail to determine which voicemails are important and which are not important.

SUMMARY OF THE DESCRIPTION

Voicemail systems, methods, and computer readable media are described herein. In one embodiment, a machine implemented method includes receiving, at a first data processing system, data representing an expiration time of a voicemail left for a user of the first data processing system, and storing the data representing the expiration time for later use by the first data processing system. This method may further include presenting a user interface to the user, which user interface alerts the user of the expiration time of the voicemail. This method may also include transmitting, in response to the expiration time, a request, from the first data processing system to a second data processing system to perform at least one of extending the expiration time or saving the voicemail. In at least certain embodiments of this method, the first data processing system may be a wireless cellular telephone or a land line phone or other telephone devices. In at least certain embodiments, the second data processing system may be a voicemail system which records voicemails left for customers of a public telephone carrier, such as a public wireless cellular telephone carrier.

In another embodiment, the machine implemented method includes recording, at a first data processing system, a voicemail left for a user, and transmitting, to a second data processing system, data representing an expiration time of the voicemail. In at least certain implementations of this method, the first data processing system may be a voicemail system which records voicemails left for customers of a public telephone carrier, and the second data processing system includes a telephone device, such as a wireless cellular telephone operated by the user. The expiration time may be based upon the time of recording of the voicemail at the first data processing system.

In another embodiment, a machine implemented method includes receiving, at a first data processing system, data representing at least one of a greeting length or a password length for a voicemail system of the first data processing system and storing the data representing the length for later use by the first data processing system. This method may further include presenting the length to a user when a user's entered data exceeds the length. In at least certain embodiments, the presenting may include retrieving the stored length without having to transmit the length for a second time through the data processing network.

In another embodiment, a machine implemented method includes receiving, at a first data processing system, a request to set up a voicemail account of a user of a second data processing system and transmitting, in response to the receiving, data representing at least one of a greeting length or a password length for the voicemail account. In at least certain implementations of this method, the data representing the at least one of the greeting length or the password length is transmitted before the user enters at least one of a password or greeting for the voicemail account. The voicemail account may be maintained by a voicemail server which records voicemails left for customers of a public telephone carrier, such as a public wireless cellular telephone carrier. Storage of the greeting length or the password length allows a telephone device to enforce a rule, such as a password length or a greeting length, without having to transmit an improper greeting or an improper password and then be notified by data from a network that the greeting or password is invalid because it is too long.

In another embodiment, a machine implemented method includes receiving, as a streaming media, data of a voicemail at a first data processing system, and playing, at the first data processing system, the voicemail as the data is received. This method may further include buffering a first portion of the voicemail in a memory of the first data processing system, and playing the first portion of the voicemail after the buffering of the first portion, and this method may further include buffering a second portion of the voicemail in the memory after the buffering of the first portion, and playing the second portion of the voicemail after the buffering of the second portion. The portions may include a plurality of packets of data, each of which includes a header which represents a time in a playback sequence of the voicemail. The portions may or may not be saved at the first data processing system after the playing of the portions.

In another embodiment, a machine implemented method includes receiving a request to transmit data of a voicemail and transmitting, from a first data processing system, the data of the voicemail as a streaming media. This data of the voicemail may be transmitted in at least a first portion and a second portion, each of which includes a plurality of packets of data, and each of the packets of data including a header which includes data representing a time in a playback sequence of the voicemail.

The telephone device, in at least certain embodiments, may include local storage for locally storing voicemails received from the voicemail server which were initially recorded at the voicemail server maintained, controlled, and/or operated by the public telephone carrier which provides telephone and/or voicemail service to the user of the telephone device.

In another embodiment, a machine implemented method includes receiving a first portion of a voicemail and a first metadata specifying a relationship for the first portion relative to the entire voicemail and storing the first portion and the first metadata, and receiving a second portion of the voicemail and a second metadata specifying a relationship for the second portion relative to the entire voicemail, and storing the second portion in the second metadata. This method may allow partial downloads of a voicemail which can be reconstructed at a receiving telephone device, such as a wireless cellular telephone. The voicemail may be reconstructed through the use of the metadata which specifies the relationship and time of the portion relative to the entire voicemail. The first portion and the second portion may be received from a voicemail system which records voicemails left for customers of a public telephone carrier, such as a public wireless cellular telephone carrier. This technique for partial receipt of voicemails may be useful when a wireless connection, such as a cellular wireless connection between the first data processing system and a voicemail server, is capable of being lost between receipt of the first and second portions of the voicemail. In another embodiment, a machine implemented method includes transmitting a first portion of a voicemail and first metadata specifying a relationship for the first portion relative to the entire voicemail, and transmitting a second portion of the voicemail and a second metadata specifying a relationship for the second portion relative to the entire voicemail.

In another embodiment, a machine implemented method includes storing a voicemail parameter for a first data processing system and associating a first metadata with a voicemail parameter and receiving second metadata from a second data processing system relating to the voicemail parameter and comparing the first metadata and the second metadata, and determining, from the comparing, whether to change the voicemail parameter at one of the first and the second data processing systems. This method may be used to determine whether a voicemail greeting stored at a voicemail server or at a telephone device is old and needs to be replaced by a newer voicemail greeting. Similarly, this method may be used to determine whether a voicemail password at one or the other of the data processing systems is old and needs to be replaced with a newer voicemail password.

In another embodiment, a machine implemented method includes establishing a first connection for playback of a first voicemail in response to a first selection of the first voicemail and establishing a second connection for playback of a second voicemail and terminating the first connection in response to a second selection of the second voicemail while the first voicemail is being played back. This method may allow a voicemail server to constrain the number of connections made to it when responding to requests to play back voicemail messages. This voicemail system or voicemail server may record voicemails for customers of a public telephone carrier, such as a public wireless cellular telephone carrier.

Other methods are described herein and systems for performing these methods are described herein and computer readable media for performing these methods are also described herein. Furthermore, various apparatuses and devices which are configured to perform these methods are also described herein.

BRIEF DESCRIPTION OF THE DRAWINGS

The present invention is illustrated by way of example and not limitation in the figures of the accompanying drawings in which like references indicate similar elements.

FIGS. 4A, 4B, 4C, and 4D illustrate examples of a user interface which may be used in at least certain embodiments of the present inventions.

DETAILED DESCRIPTION

Figure 1:
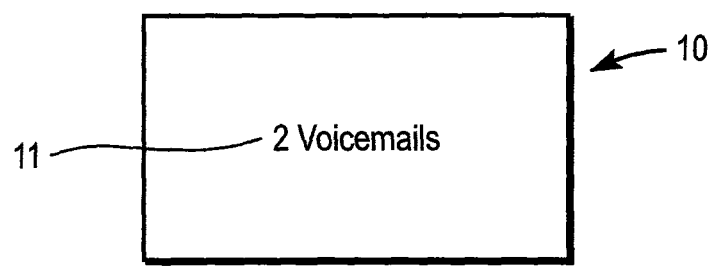
FIG. 1 shows an example in the prior art of a voicemail user interface.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

In certain embodiments, the data processing systems 20 and 30 may be implemented in a small formfactor which resembles a handheld computer having a tablet-like input device which may be a multi-touch input panel device which is integrated with a liquid crystal display. Examples of such devices are provided in U.S. patent application Ser. No. 11/586,862, filed Oct. 24, 2006, and entitled "AUTOMATED RESPONSE TO AND SENSING OF USER ACTIVITY IN PORTABLE DEVICES," which is assigned to the same assignee as the instant application. This foregoing application is hereby incorporated herein by reference.

Figure 2A:
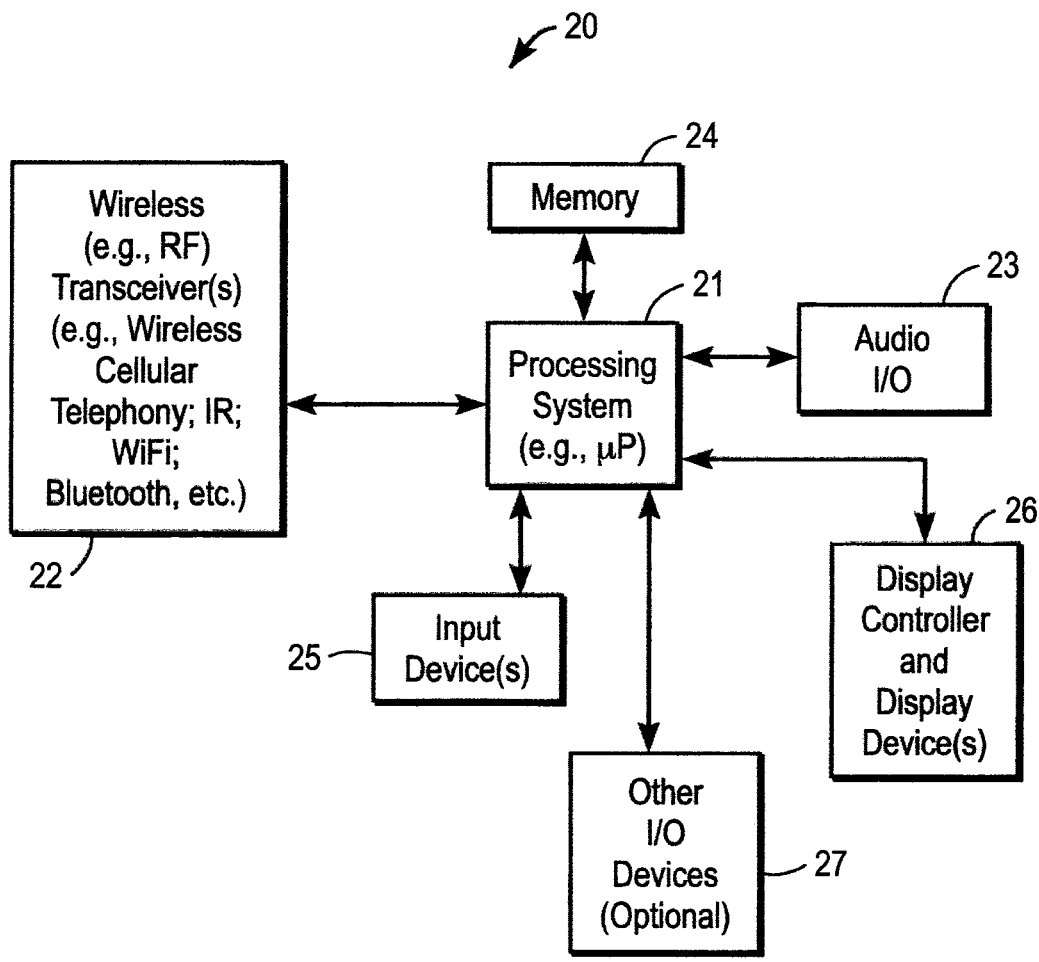
FIG. 2A shows, in block diagram form, an example of a telephone device or other communication device which includes at least one wireless transceiver.

FIG. 2A shows an example of a data processing system which may be a telephone device. The data processing system 20 includes a processing system, which may be one or more microprocessors, or which may be a system on a chip. The data processing system 20 also includes memory 24 which is coupled to the processing system 21; the memory may be used for storing data and programs for execution by the processing system. This memory may also store metadata and audio data for voicemails locally stored on the data processing system 20. The data processing system 20 also includes an audio input/output subsystem 23 which may include a microphone and a speaker for, for example, playing back music or providing telephone functionality through the speaker and microphone or for interacting with a voicemail server. A display controller and display device 26 provides a visual user interface for the user; this user interface may include a graphical user interface which is similar to that shown on a Macintosh computer when running the Mac OS X operating system software. System 20 also includes one or more wireless transceivers, such as a WiFi transceiver or an infrared transceiver or a Bluetooth transceiver, and/or a wireless cellular telephony transceiver. It will be appreciated that additional components, not shown, may also be part of the system 20 in certain embodiments, and in certain embodiments fewer components than that shown in FIG. 2A may also be used in a data processing system. The system 20 also includes one or more input devices 25 which are provided to allow a user to provide input to the system. These input devices may be a keypad or a keyboard or a touch panel or a multi-touch input panel or other known input devices or a combination of such input devices. The system 20 may also include an optional input/output (I/O) device 27 which may be a connector for a dock or a connector for a USB interface, etc. It will be appreciated that one or more buses, not shown, may be used to interconnect the various components shown in FIG. 2A, as is well-known in the art. The data processing system shown in FIG. 2A may be a handheld personal computer or a personal digital assistant (PDA), or a cellular telephone with PDA-like functionality, or a WiFi based telephone, or a handheld computer which includes a cellular telephone, or a media player, such as an iPod, or an entertainment system, such as a PlayStation entertainment system, or devices which combine aspects or functions of these devices, such as a media player combined with a PDA and a cellular telephone in one device, or a consumer electronic product or other electronic products. In other embodiments, the data processing system 20 may be a network computer or an embedded processing device within another device or consumer electronic product. In certain embodiments, if the data processing system 20 is a telephone device which is a land line telephone, the wireless transceivers 22 may be omitted.

Figure 2B:
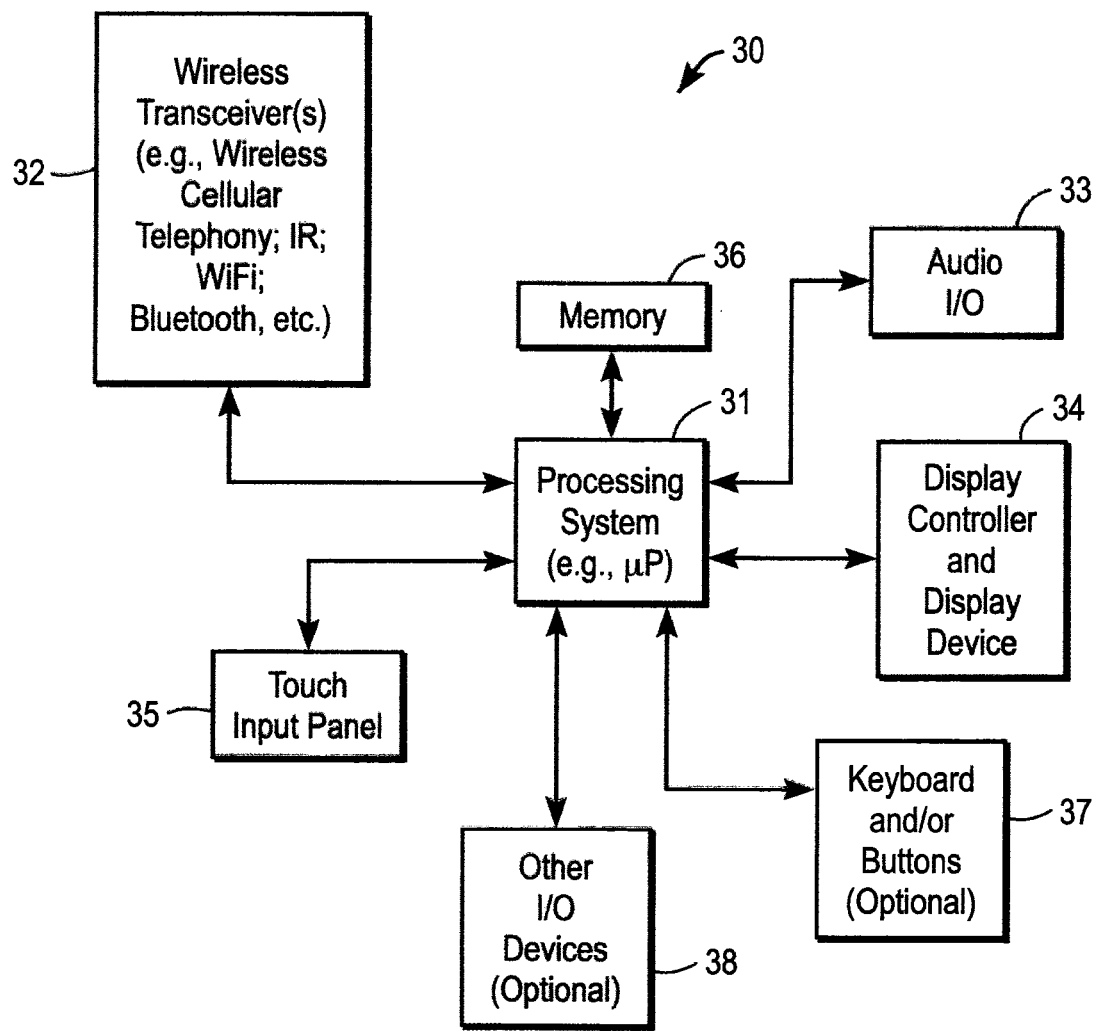
FIG. 2B shows, in block diagram form, an example of a data processing system, which may be a handheld personal computer which includes at least one wireless transceiver.

FIG. 2B shows another example of a data processing system which may be used with one or more of the embodiments described herein. The data processing system 30 may be a handheld personal computer which may have a tablet form-factor such as that shown in FIG. 2D. The data processing system 30 may include a processing system, which may be a microprocessor which is coupled to a memory 36 and which is also coupled to a touch input panel 35, which may be separate from a display device or integrated with a display device. The display device 34 is also coupled to the processing system 31. The touch input panel 35 may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 31. The display controller and display device 34 may provide a visual user interface for the user, and this visual interface may include a graphical user interface which is similar to that shown on a Macintosh computer when running OS X operating system software. The memory 36 may store data and computer programs and recorded voicemails which have been locally stored on the data processing system 30. The data processing system may also include an optional keyboard and/or buttons, such as dedicated or soft buttons, on the system to allow the user to provide inputs to the keyboard and/or the buttons. The optional keyboard may swing out or slide out from a portion of the device. In other embodiments, the keyboard is not present as the touch input panel is used to provide a keyboard for use by the user. An audio input/output subsystem 33 may include a speaker and a microphone or several speakers and microphones to provide telephone functionality, media playing functionality, and to allow a user to access a voicemail system, such as a voicemail server through a telephone network. The data processing system 30 may also include other input/output devices 38, and it is shown as including one or more wireless transceivers, such as a WiFi transceiver, an infrared transceiver, a Bluetooth transceiver, and/or a wireless cellular telephony transceiver. It will be appreciated that additional components, not shown, may also be part of the system 30 in certain embodiments, and in certain embodiments, fewer components than that shown in FIG. 2B may also be used in a data processing system according to various embodiments of the present inventions. The data processing system 30 may be a PDA or a cellular telephone with PDA-like functionality or a cellular telephone without PDA functionality or a handheld personal computer which includes a cellular telephone and a media player, such as an iPod, or consumer electronic products or other electronic products which allow for access to voicemail functionality.

Figure 2C:
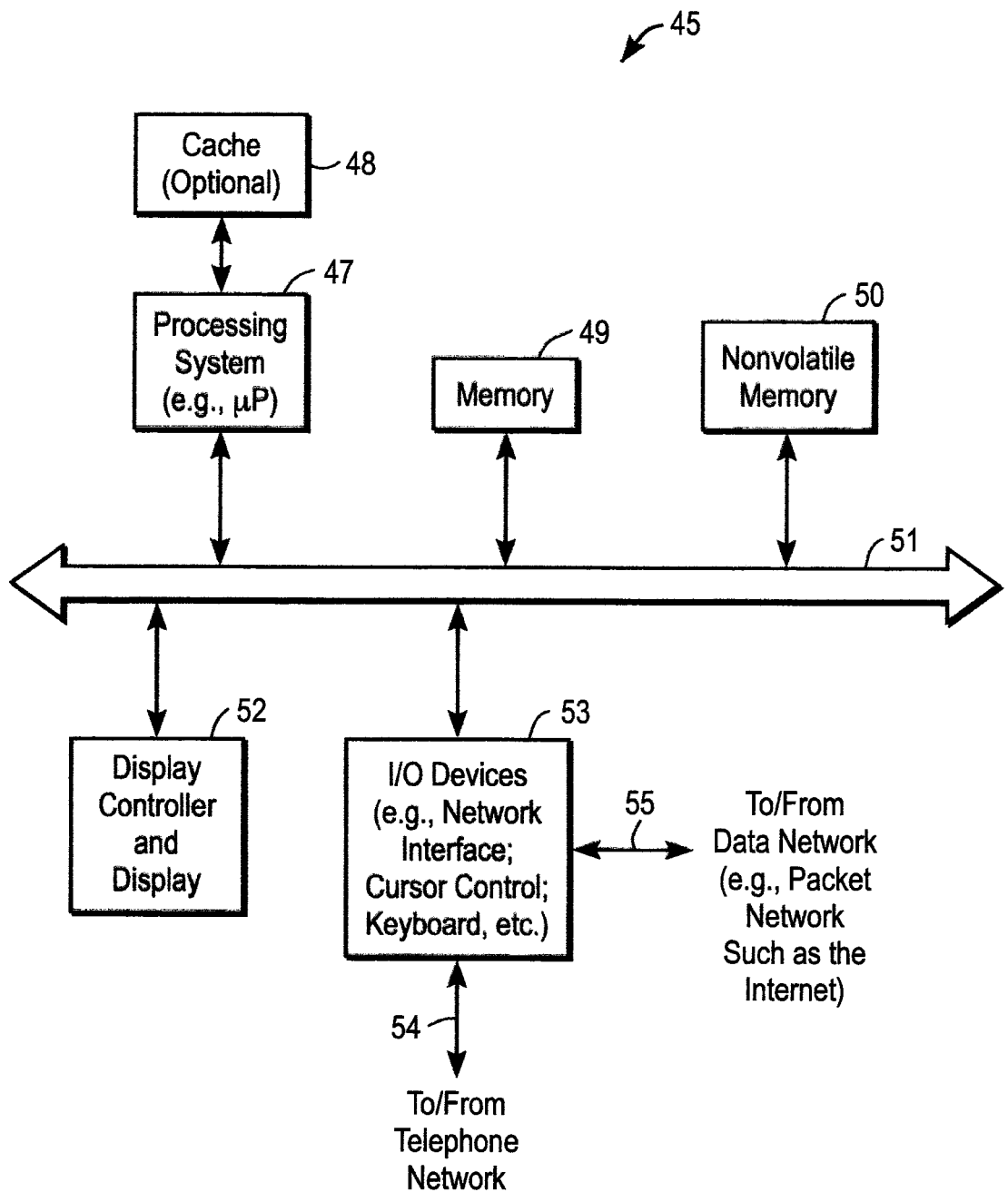
FIG. 2C shows an example of a data processing system; this data processing system may be used to implement a voicemail server in at least certain embodiments.

FIG. 2C shows an example of a data processing system which may be used to implement a voicemail server. It will be appreciated that other types of voicemail servers, implemented with a different architecture, may also be used with one or more of the embodiments of the present inventions described herein. Note that while FIG. 2C illustrates the various components of the data processing system 45, it is not intended to represent any particular architecture or manner of interconnecting the components, as such details are not germane to the present inventions. It will also be appreciated that a system having additional components not shown in FIG. 2C or having fewer components than that shown in FIG. 2C may also be used to provide a voicemail server or functionality for a voicemail server. The data processing system 45 includes a bus 51 which is coupled to one or more microprocessors which form a processing system 47. The bus 51 is also coupled to memory 49 and to non-volatile memory 50, which may be a magnetic hard drive or other non-volatile memory device which may store data and software to operate the data processing system 45 as well as storing voicemails left for a plurality of customers of a public telephone carrier, such as a public wireless cellular telephone carrier. The bus is also coupled to a display controller and a display 52, which may be optional in certain instances. Further, the bus is coupled to one or more input/output devices and/or controllers 53. This may include network interface controllers or network interface cards, cursor control devices, keyboards, etc. in order to allow input and output for the data processing system 45. In at least certain embodiments, the data processing system 45 will include at least one network interface card or interface device to allow data to and from a data network to be processed by the data processing system 45. For example, an Ethernet network interface may provide one or more ports 55 which act as an interface to a data network, such as a packet network, such as the Internet. Hence, data from the data network may be received through port 55 and data for transmission to the network may be received through the port 55. Similarly, an input/output controller and device may provide a port 54 for connection to a telephone network, such as a POTs telephone network. This allows the data processing system 45, if it is functioning as a voicemail server, to be coupled to both the Internet and a conventional telephone network, such as a POTs network, to receive and record voicemail messages from callers on both the Internet and the POTs network as will be described further in connection with FIG. 3. The memory 49 may be implemented as dynamic RAM (DRAM) which provides fast access to data but which requires power continually in order to refresh or maintain the data in the memory. The non-volatile memory 50 may be a magnetic hard drive or other non-volatile memory which retains data even after power is removed from the system. While the architecture of FIG. 2C shows that the non-volatile memory 50 is a local device coupled directly to the rest of the components in the data processing system, it will be appreciated that other embodiments may utilize a non-volatile memory which is remote from a system, such as a network storage device or a storage area network which is coupled to the data processing system through a network interface, such as a modem or an Ethernet interface. The bus 51, as is well-known in the art, may include one or more buses connected to each other through various bridges, controllers, and/or adapters as is known in the art.

It will be apparent from this description that aspects of the inventions may be embodied, at least in part, in software. That is, the techniques may be carried out in a computer system or other data processing system in response to its processor or processing system executing sequences of instructions contained in a memory, such as memory 24, or memory 36, or memory 49, etc. In various embodiments, hardwired circuitry may be used in combination with the software instructions to implement the present inventions. Thus, the techniques are not limited to any specific combination of hardware circuitry and software, nor to any particular source for the instructions executed by the data processing systems.

Figure 2D:
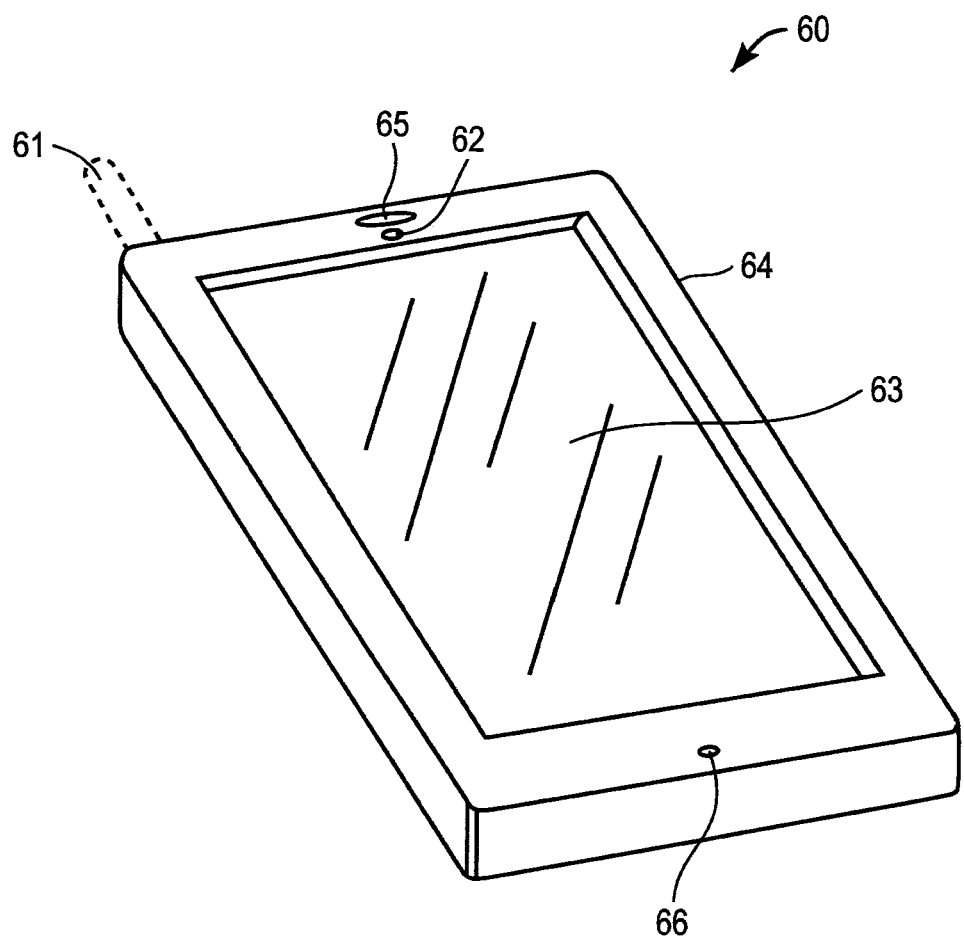
FIG. 2D shows a formfactor for a data processing system, such as a handheld personal computer in a tablet form factor.

FIGS. 2D, 2E, 2F, and 2G illustrate various form factors for telephone devices which may be used with at least certain embodiments of the present inventions. These telephone devices may be wireless cellular telephones or cordless land line phones or corded land line phones or WiFi phones which are designed to operate wirelessly through a WiFi or WiMax network to transmit and receive phone calls. Each of these telephone devices may be used to initialize a voicemail account and to access and use the voicemail account as described herein in connection with various embodiments. The formfactor of FIG. 2D may be considered to be a handheld tablet cellular telephone, although in other embodiments it may be larger, such as a tablet laptop computer. The formfactor shown in FIG. 2D may or may not include a slide out or swing out keyboard and/or touch wheel. It also may or may not include dedicated or soft buttons on the device. As shown in FIG. 2D, the data processing system 60 includes a display 63 which occupies a substantial portion (e.g. more than 75%) of one surface of the data processing system 60. The data processing system 60 may have a substantially rectangular frame 64 on which is disposed the display 63 which may include an integrated touch input panel, such as a multi-touch input panel. A microphone 66 and a speaker 65 are also disposed on one surface of the data processing system 60. An optional external antenna 61 may also be included or, in certain embodiments, may not be included. The data processing system 60 may also include one or more sensors, such as the sensor 62, which may be, in one embodiment, a proximity sensor or an ambient light sensor or other sensors or a combination of such sensors. The microphone 66 and the speaker 65 may be part of the audio input/output subsystem of the data processing system, such as the audio input/output 23 of FIG.

2A or the audio input/output 33 of FIG. 2B. When the data processing system 30 of FIG. 2B is implemented within the formfactor shown in FIG. 2D, the touch input panel 35 may be integrated with the display device 34 such that the display and the touch input panel are overlapping and registered to each other. The data processing system 60 shown in FIG. 2D may be implemented in a handheld formfactor which has a size such that it may be held in one hand of a user. In at least one embodiment, this system may have a size in a first dimension of less than about 8 inches and a size in a second dimension of less than about 4 inches and a size in a third dimension of less than about 1.5 inches. Each of these dimensions may be an axis of one of the axes in an X, Y, Z coordinate space. In other embodiments, the data processing system 60 may have a size in a first dimension of less than about 5 inches and a size in a second dimension of less than about 2.5 inches and a size in a third dimension of less than about 1 inch.

Figure 2E:
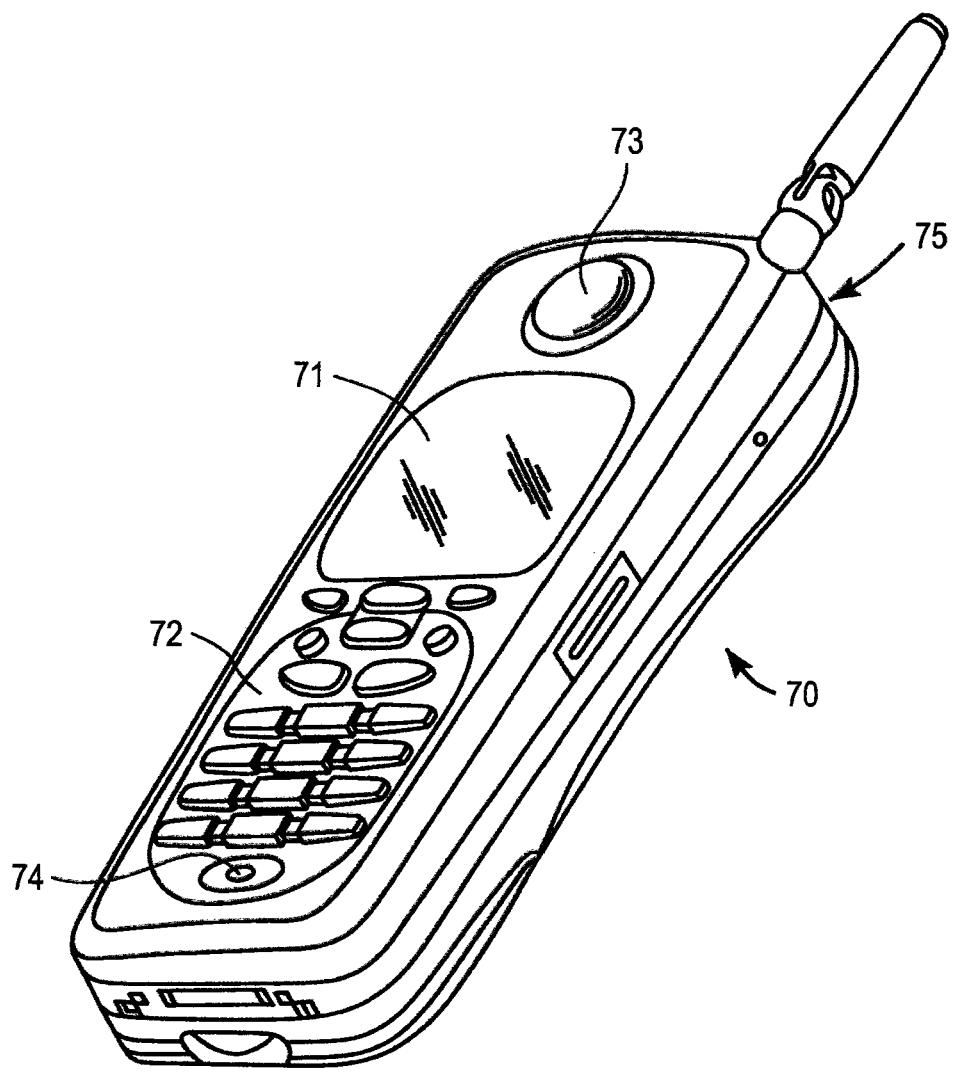
FIG. 2E shows an example of a telephone device which may be used in at least certain embodiments of the present inventions.

FIG. 2E shows another formfactor for a telephone device, which may be a wireless cellular telephone or corded land line phone. Such a telephone device may be used in one or more of the embodiments described herein to initialize a voicemail account and to access and use a voicemail account as described herein. The telephone device 70 of FIG. 2E includes a display 71 and a keypad 72 and a speaker 73 and a microphone 74. In at least certain embodiments, the telephone device 70 may open up at the seam 75 to expose an internal QWERTY keyboard and/or touch wheel or other input device. Further, an additional display within the phone, which is exposed when the seam 75 is opened, may also be present inside the telephone device 70. In other embodiments, the telephone device 70 may include a sliding out or swinging out keyboard or other input device. In other embodiments, the telephone device 70 may include a small thumb QWERTY keyboard instead of the keypad 72; an example of such a small thumb QWERTY keyboard is found on Blackberry telephone/email devices.

Figure 2F:
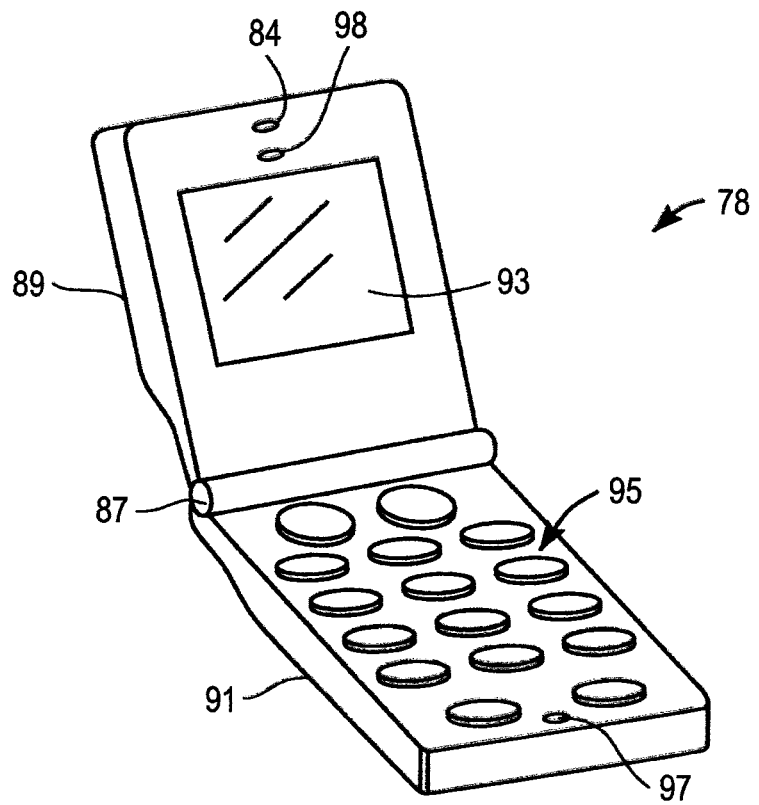
FIGS. 2F and 2G show another formfactor for a telephone device which may be used with at least certain embodiments of the present inventions.
Figure 2G:
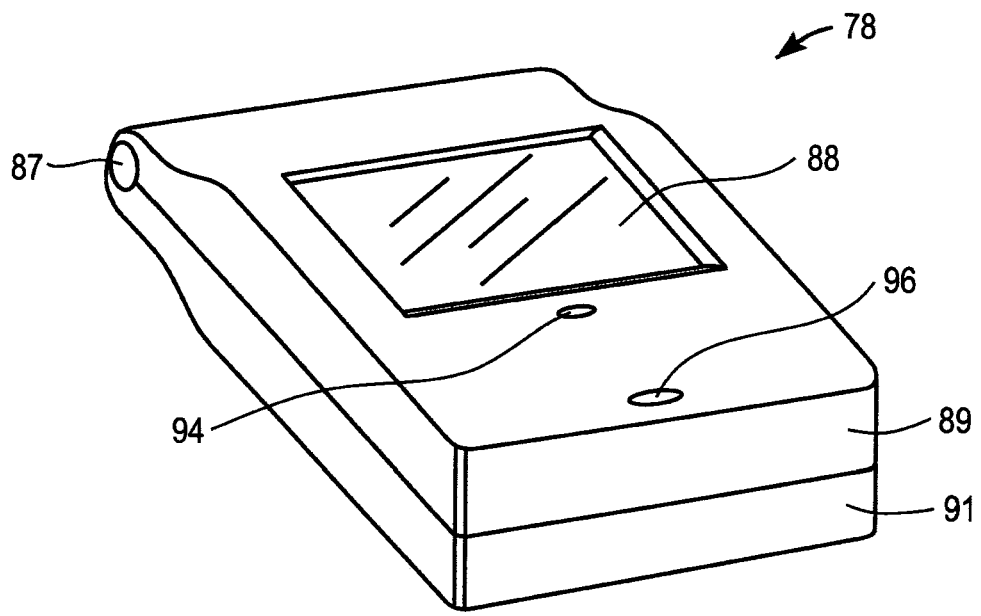

FIGS. 2F and 2G illustrate another formfactor for a telephone device. This formfactor may be referred to as a clamshell or a flip phone formfactor. This telephone device 78 includes a display housing 89 and a keypad housing 91 which are coupled together by a hinge 87. The telephone device 78 may be a wireless cellular telephone which may include an antenna (not shown) on the display housing 89. The hinge 87 allows a user to open and close the cellular telephone so that it can be placed in at least one of two different configurations shown in FIGS. 2F and 2G. The keypad housing 91 may include a keypad 95 which receives inputs from a user and a microphone 97 which receives voice input from the user. The keypad 95 may be implemented as a set of mechanical buttons or as a touch input panel or a multi-touch input panel. The display housing 89 may include, on its interior surface, a display 93, such as a liquid crystal display, and a speaker 98 and a sensor, such as a proximity sensor or other sensors. FIG. 2G shows the telephone device 78 in its closed configuration; in this configuration, it can be seen that the display 88 is on the exterior surface of the display housing 89, and that a speaker 97 is also on that exterior housing. Further, a sensor, such as a proximity sensor or an ambient light sensor 94, is also on the exterior surface of the display housing 89. The telephone device 78 may include the data processing system 20 shown in FIG. 2A or the data processing system 30 shown in FIG. 2B. In addition, the telephone device 78 may further include a slide out or swing out keyboard or other input device.

Figure 3:
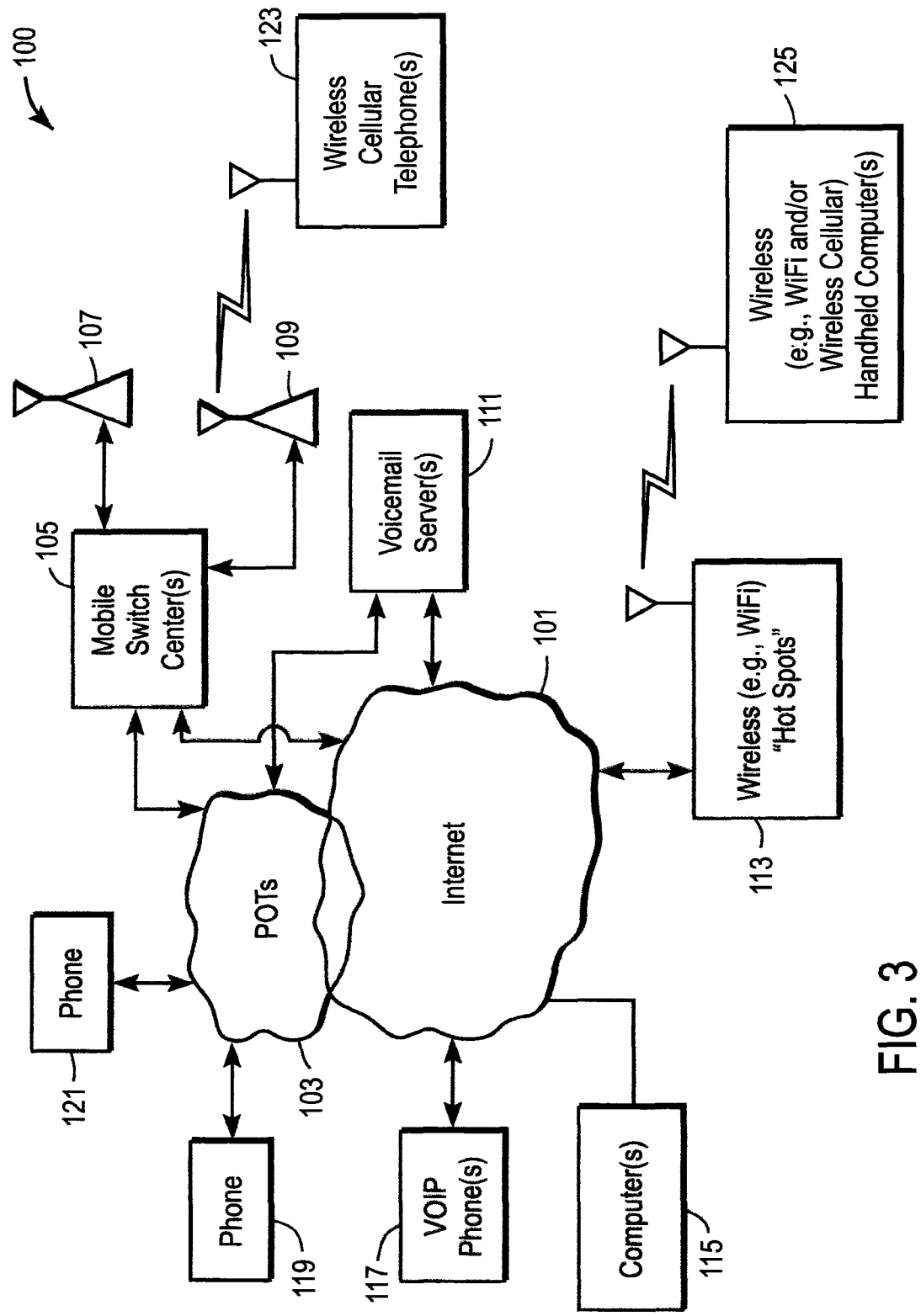
FIG. 3 shows an example of a network which includes telephone devices and at least one voicemail server which may be used in at least certain embodiments of the present inventions.

The system 100 shown in FIG. 3 represents a modern telephone system which includes a data network such as the Internet 101 and the conventional, plain old telephone system (POTs) 103 which are in some way or another interconnected as shown by the overlap between the Internet 101 and POTs 103. Land line phones or cordless land line phones, such as phones 119 and 121, are shown coupled to POTs 103. One or more voice over IP (VOIP) telephones 117 are shown coupled to the Internet 101. One or more computers 115, such as general purpose data processing systems, are also coupled to the Internet 101. The computers 115 may be, for example, a desktop or laptop computer such as a Macintosh computer or a computer running a Windows operating system and may include software to provide a VOIP telephone through the computers 115. One or more wireless access points 113, such as a WiFi hot spot, may also be coupled to the Internet 101 to provide connectivity to WiFi telephones or wireless handheld computers or other wireless computer which include WiFi transceivers, etc. At least one wireless telephone network is coupled to the POTs 103 as shown in FIG. 3 through the one or more mobile switch centers 105 which are in turn coupled to one or more cell towers, such as cell towers 107 and 109. The cell towers 107 and 109 are in wireless cellular communication, through wireless cellular telephony, with wireless cellular telephones, such as one or more wireless cellular telephones 123. One or more wireless handheld computers 125 may be in communication with a wireless access point or a plurality of wireless access points 113 and may also be in communication with a cellular telephone network through, for example, one of the cell towers 107 and 109. The mobile switching center 105 will typically include one or more connections to POTs 103 and one or more connections to the Internet 101. One or more voicemail servers 111 are also coupled to the Internet 101 and to the POTs 103. The voicemail servers are typically provided and controlled by a public telephone carrier, such as AT&T, or a public wireless cellular telephone carrier, such as Verizon Wireless. A public telephone carrier is any service provider of telephone service which accepts a contract to provide telephone service (which may include voicemail service) to any member of the public as long as that member provides consideration (e.g., pays service fees) for the service. Similarly, a public wireless telephone carrier is any service provider of a wireless telephone service (such as a CDMA or GSM wireless cellular service or a WiFi or WiMax wireless service) which accepts a contract to provide wireless telephone service (which may include voicemail service) to any member of the public as long as that member provides consideration (e.g., pays service fees) for the service. These carriers operate or control the voicemail servers to record voicemails left for customers of the public telephone carrier or the public wireless cellular telephone carrier. For example, a caller from phone 121 may call the phone number of one or more wireless cellular telephones 123, and if there is no answer, leave a voicemail by causing the voicemail to be recorded on the voicemail server 111 for the user of the one or more wireless cellular telephones 123. Similarly, a caller from the voice over IP phone 117 may leave a message on the voicemail server for a customer of a public telephone carrier, which may be the user of phone 121 or the user of the wireless handheld computer 125 or the user of the wireless cellular telephone 123. In this manner, any one of the telephone devices, such as telephone devices 119, 121, 117, 115, 125, and 123 may leave a voicemail for other telephone device users on one or more voicemail servers, such as the voicemail servers 111. These voicemails may be accessed and listened to by making a conventional telephone call to the voicemail server through a telephone device. As will be described further below, in at least certain embodiments, the voicemails may also be accessed through a data network, such as an HTTP connection through the Internet to the voicemail servers 111.

In at least certain embodiments, a voicemail database may be maintained on a voicemail server and/or a voicemail database may be maintained on a telephone device, such as the data processing system 20 or the data processing system 30 which may be contained within the wireless cellular telephone 123 or the wireless handheld computer 125 of FIG. 3. The database on each system may include an audio file or a pointer to an audio file which provides the voicemail message as well as metadata concerning the voicemail message, such as whether the message has been listened to, whether the message is to be deleted, whether the message has been marked as important or not, etc.

Figures 4A, 4B, 4C:
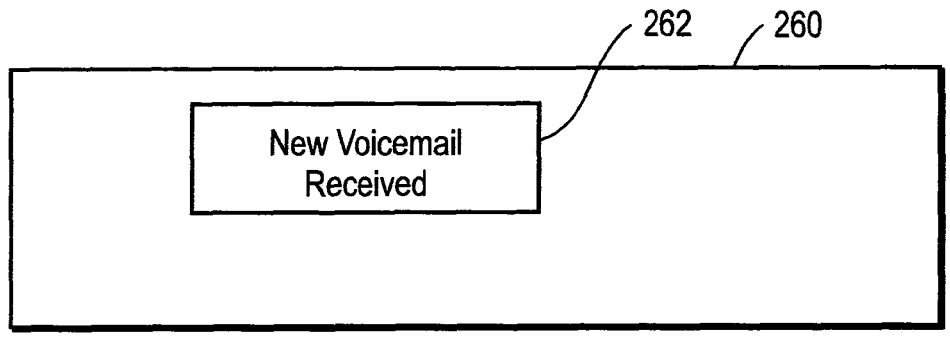

FIGS. 4A-4D reflect the presentation of a user interface on a telephone device for which the voicemail account exists, such as any one of the telephone devices shown in FIG. 3, which may include, within any one of those telephone devices, a data processing system such as that shown in FIGS. 2B or 2C. The presentation may occur by displaying information on a display device; alternatively, the presentation may occur by providing sounds to a speaker to those who are blind, or other presentations (Braille) etc. The display 260 may be the entire display surface of the telephone device or a portion thereof, such as a window having a border. FIG. 4A shows an example of an alert which may appear in response to a notification of, for example, a new voicemail. Upon seeing the alert 262, the user may select to see the voicemails by issuing a command to the telephone device; alternatively, the system may automatically, after a period of time or otherwise, cause the presentation of a list of voicemails, such as that shown in FIG. 4B which includes the list 264 within the display 260. Each voicemail includes at least some data in fields arranged as columns. One field is a name field which includes at least one name ("John") in the case of the third voicemail from the top. The other voicemails do not include a name because their phone numbers have not been associated with an entry in a contact or address book (stored at either or both of the telephone device or the voicemail server) which includes names associated with at least certain phone numbers. The phone number column specifies the phone number of the person who left the voicemail. The date/time column represents the date the voicemail was left, and the length column indicates the duration of the voicemail. Other data may also be shown, such as whether or not the voicemail has been listened to. This may be indicated by highlighting those which have been listened to and not highlighting the others, or by providing some other indicator, such as the indicators 266 and 267, which indicate that the third and fourth voicemails have not been listened to but the other two voicemails shown in the list 264 have been listened to. It will be understood that there may be many additional voicemails shown in the list 264, each with pertinent metadata with respect to the voicemail. The voicemails may be sorted by selecting a sort command from the "sort by" menu 265. In the example shown in FIGS. 4B and 4C, the voicemails are sorted by date; alternatively, they may be sorted by name or phone number or by length of time. Other sorting options may also be available depending upon the metadata which is associated with each voicemail (e.g. importance of voicemail as designated by the caller, expiration date, etc.). The user interface shown in FIG. 4B allows a user to browse the list of voicemails and select any one of them for further action or operation. For example, the user may browse the list and decide to listen first to the fourth or tenth voicemail rather than the voicemail at the top of the list, which is the oldest voicemail in this example. In other words, the user is not constrained to listen to the voicemail in the order determined by the recording or receipt of the voicemail by the voicemail server. Rather, the user may randomly select any voicemail in any order such that the series of voicemails selected in a particular order does not have to match the order presented by the voicemail server.

The user interface shown in FIGS. 4B, 4C and 4D may also include user selectable commands or controls to perform operations with respect to the various voicemails. For example, the controls may include commands or controls to delete a voicemail, save a voicemail, forward a voicemail to another telephone number or voicemail server, listen to a voicemail, or move a voicemail to a folder, such as a folder for voicemails from work or voicemails for home, etc. These commands may be presented as menu items on a menu bar or may be accessed from a pull down menu or a pop up menu or other menu structures. The user may be able to select these commands by tapping the commands or pointing a cursor at the commands and pressing a button or by other techniques known in the art.

The interface shown in FIG. 4C occurs or is presented after the user has selected a particular voicemail for playback; in other words, the user in this case has selected the third voicemail from "John" to listen to by playing it back. In response to the selection, the indicator 266 is removed and a time line with playback controls is displayed under the metadata for the voicemail from John. The time line 270 includes a beginning indicator 271 and an ending indicator 272 and includes a current time indicator 274. The term "time line" (such as playback time line) is meant to include any representation, such as a line or a circle or other shape or form which can represent time and allow a user to select a time within a voicemail, at least with some level of granularity in time. The current time indicator indicates the time within the voicemail at the current playback moment. In the particular example shown in FIG. 4C, the current playback time is about halfway through the voicemail as indicated by the current time indicator 274. This current time indicator may merely indicate the time or, in other embodiments, may be user-adjustable in that the user may select the current time indicator and move it left or right to select a different playback time, causing the playback to begin from that time. The user may drag the indicator 274 or may touch or select a new location for the indicator 274, causing it to be re-located to the new location and causing playback to occur from that point, which may be an arbitrarily selected point. Normally, the time indicator moves from left to right beginning from the beginning indicator 271 and ends at the ending indicator 272. Playback controls 275, 276, 277, 278, and 279 allow a user to stop the playback, start the playback, pause the playback, fast forward through the playback, or move in reverse by selecting one of these controls. For example, selecting the stop control 275 will cause the playback to be stopped. Selecting the playback control 276 will cause playing to begin from a currently stopped position. The pause control 278 will pause the voicemail at the current position without resetting the voicemail to the beginning of the voicemail file (thereby causing the current time indicator 274 to move back to the beginning indicator 271). In other words, the pause control 278 merely stops the playback but allows the playback to continue from where it was stopped by selecting the playback control 276. The fast forward control 277 allows the user to move quickly through the voicemail recording to get to a later point. The reverse control 279 allows the user to move in reverse in time through the time sequence of the voicemail. It will be appreciated that in certain embodiments, the time line indicator may be presented by itself without playback controls and yet in other embodiments, only the playback controls may be presented without a time line indicator with its associated control or indicator. In other embodiments, the playback controls and/or the time line indicator may be placed in another location in the user interface rather than adjacent to (e.g. underneath) the voicemail being played back. In addition, other user interface controls may be presented or used such as scrolling or window related commands. The list may be scrollable through the use of a cursor or a stylus or a finger; the scrolling may occur through direct manipulation of the list on a touch input panel, such as a single or multi-touch input panel. The list may be presented in a window which can be minimized or closed or re-sized.

Another aspect of at least certain embodiments is shown in FIG. 4D which illustrates how the user may view and manipulate other voicemails while one voicemail is being played back. In the example shown in FIG. 4D, playback of the third voicemail from John is occurring while a user has selected the second voicemail (from "408-720-8383") and has caused that voicemail to be deleted. This may occur while the user is listening to the playback of the voicemail from John. In other embodiments, a user may perform other operations with respect to one or more voicemails while listening to another voicemail. FIG. 4D also shows another aspect of the user interface; in particular, a current time indicator 274 has moved closer to the ending indicator 272, indicating that the voicemail from John is nearly completely played back.

Figure 5A:
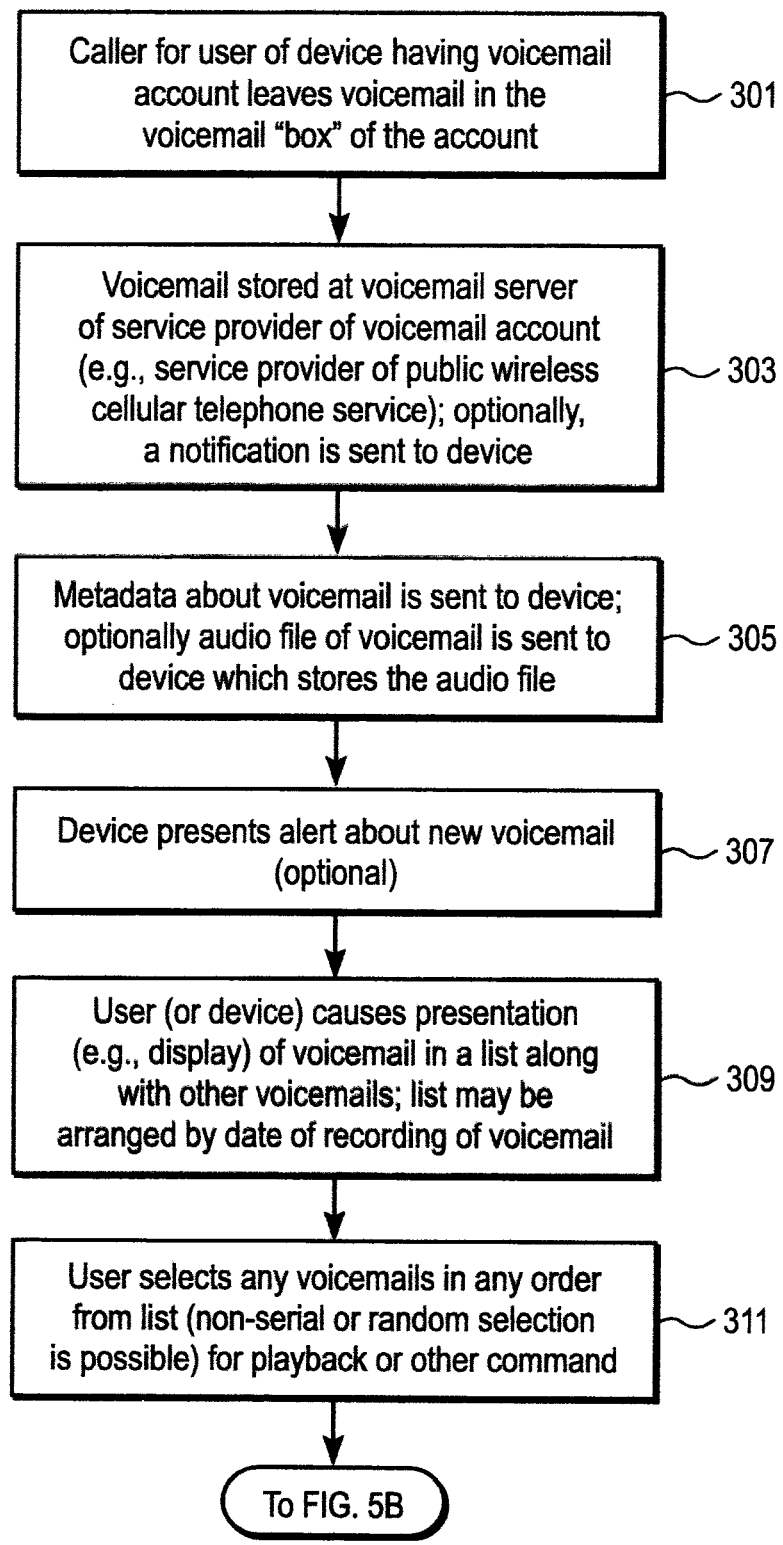
FIGS. 5A and 5B are flow charts illustrating a method according to certain embodiments of the present inventions.
Figure 5B:
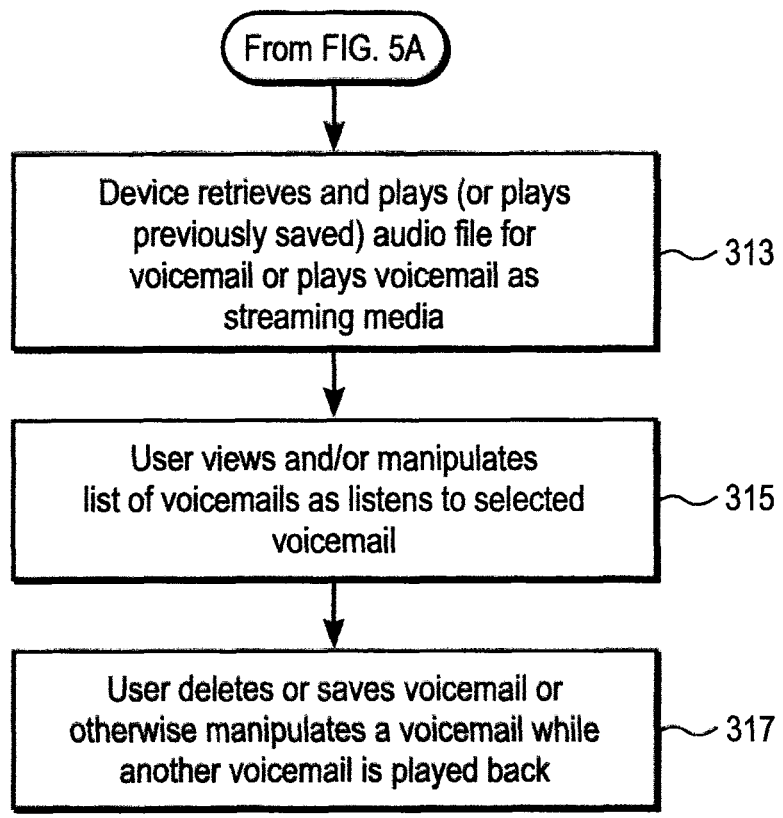

FIGS. 5A and 5B will now be referred to describe an example of how a voicemail user interface may operate. In operation 301, a caller for the user of a telephone or other device having the voicemail account leaves a voicemail in the voicemail box of the account. This voicemail, in operation 303, is stored at a voicemail server of a service provider of the voicemail account. For example, the service provider may be a public wireless cellular telephone carrier and the telephone device may use the telephone service provided by this public wireless cellular telephone carrier. In this embodiment, the voicemail server records voicemails left for the customer of the public telephone carrier. Optionally, a notification may be sent to the device that the voicemails have changed at the server. Metadata about the voicemail is sent in operation 305 to the device. Optionally, the audio file of the voicemail is sent to the device which stores the audio file on the device. The metadata may include the phone number of the caller, optionally the name of the caller (which may be entered through the keypad of the caller or by a lookup operation which compares the caller's phone number to a stored name for that caller). The metadata may also include the length of the voicemail, any markers, such as "urgent" or "special," the date and time of the voicemail, and the length of the voicemail. In operation 307, the telephone device may present an alert about the new voicemail, such as the alert 262 shown in FIG. 4A. Then the user or the device may cause the presentation of voicemails in a list, such as the list 264. In one embodiment, this list may be arranged by the date of recording of the voicemail as shown in the list 264. Then in operation 311, the user may select any voicemail in any order from the list rather than being required to enter a selection serially beginning from the oldest voicemail to the most recent voicemail. This selection may be a selection for playback or any other command in at least certain embodiments. In the example shown in FIG. 4B, the user may select the fourth voicemail or the tenth voicemail as the first voicemail to be listened to, even though other voicemails which have not been listened to are older, etc. In other words, the user is not constrained by the order of recording of the voicemails. This user interface may be implemented on a display such as that shown in FIG. 2D or the display 71 shown in FIG. 2E or the display 93 and/or the display 88 shown in FIGS. 2F and 2G, respectively. In response to the selection in operation 311, the system retrieves and plays or plays the previously stored audio file for the voicemail which has been selected in operation 313. Alternatively, the telephone device may play the voicemail as a streaming media or download portions of the voicemail for playback as described elsewhere herein. As shown in operation 315, the telephone device may allow a user to view and/or manipulate one or more voicemails in the list of voicemails as the user listens to the voicemail which was selected in operation 311. The manipulation described in operation 315 may occur in operation 317 in which a user deletes or saves a voicemail or otherwise manipulates a voicemail while another voicemail is being played back.

Figure 6:
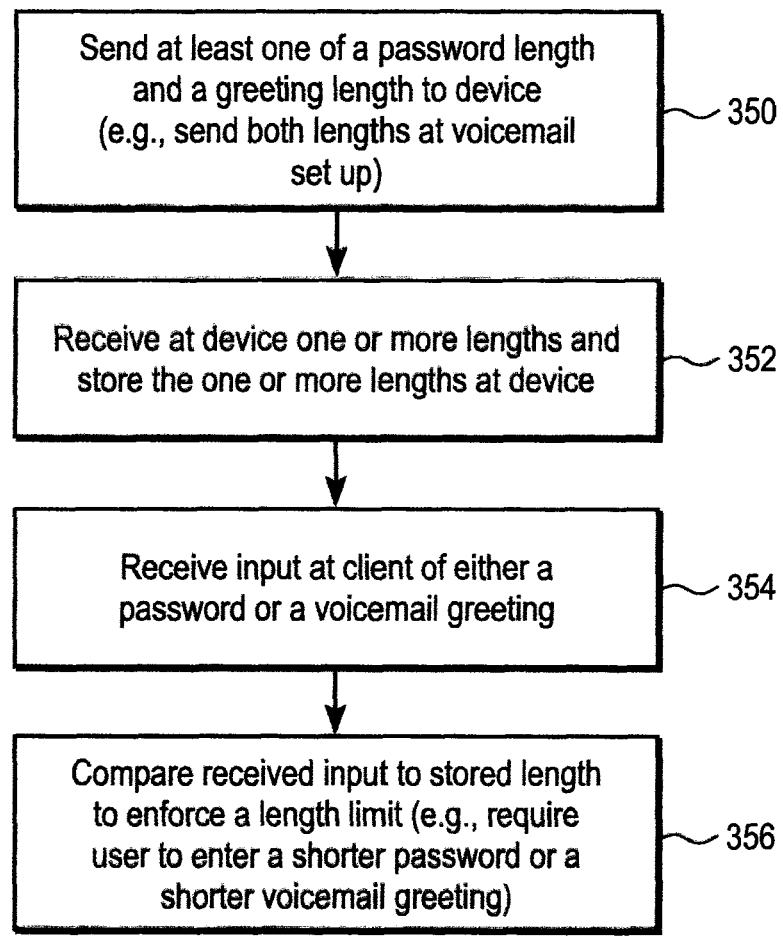
FIG. 6 is a flow chart illustrating a method according to at least certain embodiments of the present inventions.

FIG. 6 shows another aspect of certain embodiments of the inventions. The method shown in FIG. 6 shows how a client device can locally enforce a voicemail parameter without having to receive additional information from a voicemail server. The voicemail parameter may be the length of a voicemail greeting or the length of a password or another parameter. In operation 350, at least one of a password length and/or a greeting length is sent to the device; this would typically occur upon the initialization of a voicemail account. In other words, when the voicemail account is initially being set up, the transmission of these lengths would typically occur at that time. The device in operation 352 receives the one or more lengths and stores them for future use at the device. In operation 354, the device receives either a password, such as a new password or a changed password, or a new greeting or a changed greeting. In response to operation 354, the system compares, in operation 356, the received input to the stored data to enforce the voicemail parameter. In the case of a password length, the system compares the length of the password inputted in operation 354 to the length stored for a password which is valid. This length may be specified as two lengths which include a minimum length and a maximum length, although in certain embodiments, it may be one length which is merely the minimum length or the maximum length. In another embodiment, the length may specify the length of a voicemail greeting in seconds, for example. Hence, in this case, operation 356 would compare the length of a new or changed voicemail greeting to the limit in time for a voicemail greeting transmitted in operation 350. This allows the client device to locally enforce the parameter without requiring that the new or changed password or new or changed greeting be transmitted to a voicemail server or some other voicemail system within the infrastructure and rejected, causing a rejection message to be sent back to the client device. In other words, network traffic can be reduced by locally enforcing the voicemail parameter at the client device.

Figure 7:
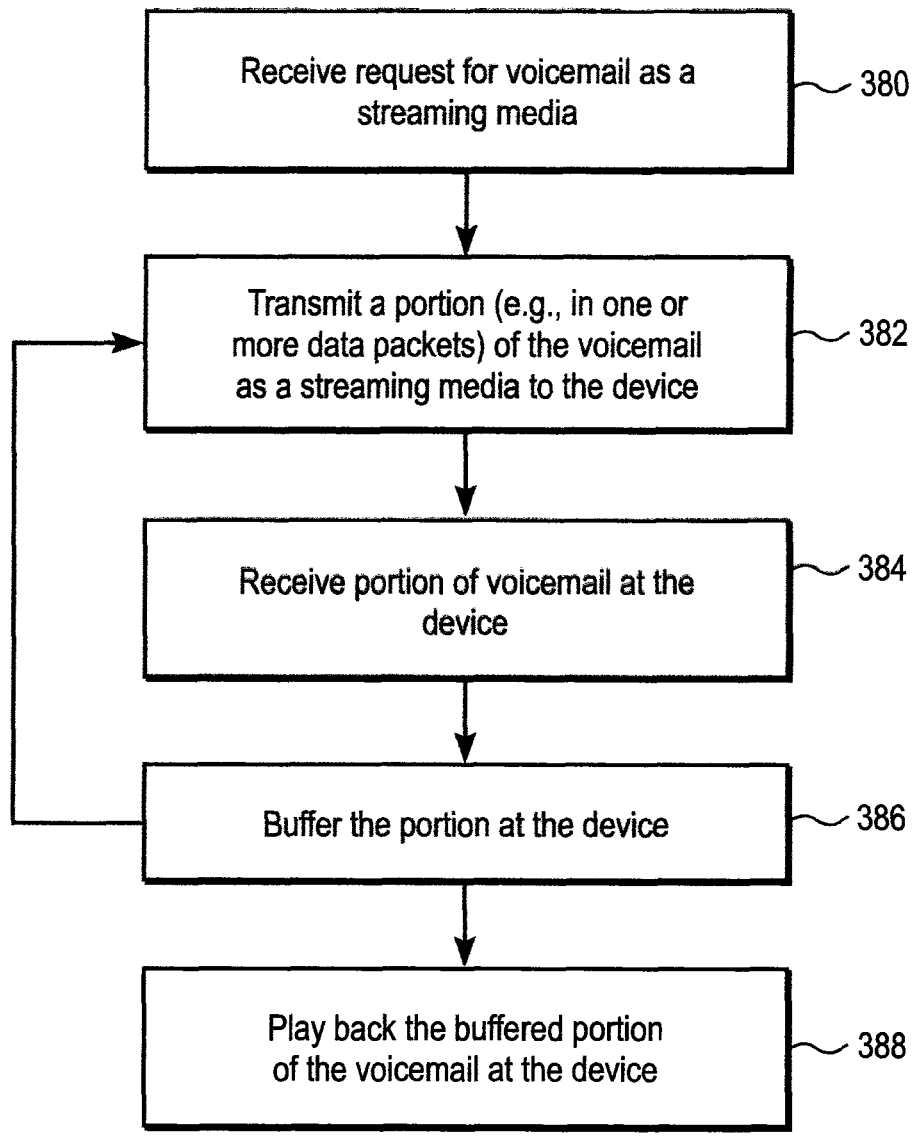
FIG. 7 is a flow chart illustrating a method according to at least certain embodiments of the present inventions.

FIG. 7 shows another aspect of at least certain embodiments of the present inventions. The method of FIG. 7 relates to the streaming of voicemails from a voicemail server or other server to the client device, which may be any one of the telephone devices shown in FIG. 3 and which may include the data processing system, such as the system 20 or 30 shown in FIGS. 2A and 2B, respectively. In operation 380, a system within the infrastructure receives a request for a voicemail as a streaming media. The system may be a voicemail server, such as the voicemail server 111 shown in FIG. 3. In response, the system transmits a portion, in operation 382, of the voicemail as streaming media to the device. The portion may be transmitted as one or more data packets, each having a header which specify a time or frame number or multiple times or multiple frame numbers associated with the portion relative to the entire voicemail. In operation 384, this portion of the voicemail is received at the device, and this portion is buffered in operation 386. The transmission, receipt and buffering in operations 382, 384, and 386 are typically repeated several times. The portions are buffered as they are received and the transmission typically continues while the receipt and the buffering continues. In a typical streaming operation, playback in operation 388 occurs after a sufficient quantity of data has been buffered from operation 386. The playback occurs by retrieving data from the buffer as it is also being filled by new data from operation 384. The playback of a received portion of the voicemail in the streaming media can occur as later portions in the streaming media are being received and buffered. In this manner, at least some voicemails can be retrieved by using a streaming media technique rather than downloading the file and saving it locally on the telephone device.

Figure 8:
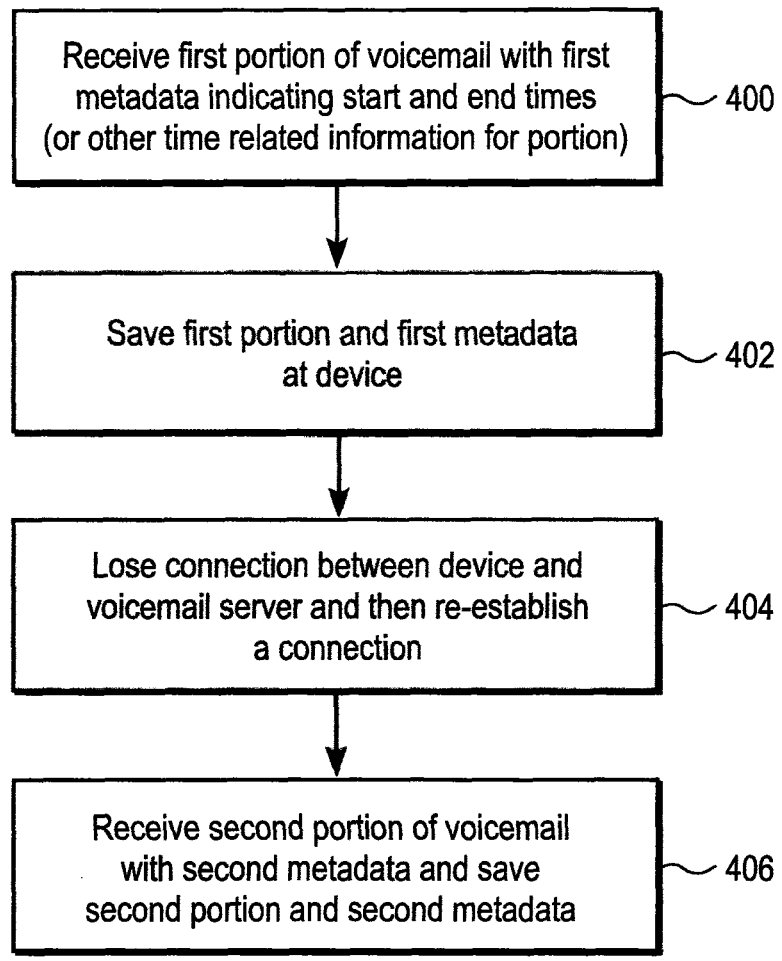
FIG. 8 is a flow chart illustrating a method according to at least certain embodiments of the present inventions.

FIG. 8 shows a method according to another aspect of at least certain embodiments of the inventions. The method of FIG. 8 does not utilize a streaming media technique but rather uses a partial download technique to download portions of the voicemail along with identifiers which indicate how the portion fits within the entire time sequence of a voicemail. In operation 400, a telephone device, which may be any one of the telephone devices shown in FIG. 3 and which may include the systems 20 or 30 shown in FIGS. 2A and 2B, respectively, may receive a first portion of a voicemail with first metadata indicating start and end times or other time related information for that portion relative to the entire voicemail time sequence. This information is saved in operation 402. If the telephone device is coupled to the voicemail server through the wireless telephone connection, it is possible that the connection could be lost, as shown in operation 404, and then reestablished. It will be understood that operation 404 is optional and that the second portion may be received from operation 406 without having lost the connection. The second portion of voicemail data also includes second metadata which specifies a time relationship of the second portion relative to the entire time sequence of the voicemail. The partial downloading of voicemails with this metadata allows for downloading of voicemail audio files or other voicemail information even in wireless cellular networks which may have sporadic coverage. The playback of a received portion (e.g. first portion) can occur before or while receiving another portion of the voicemail.

Figure 9:
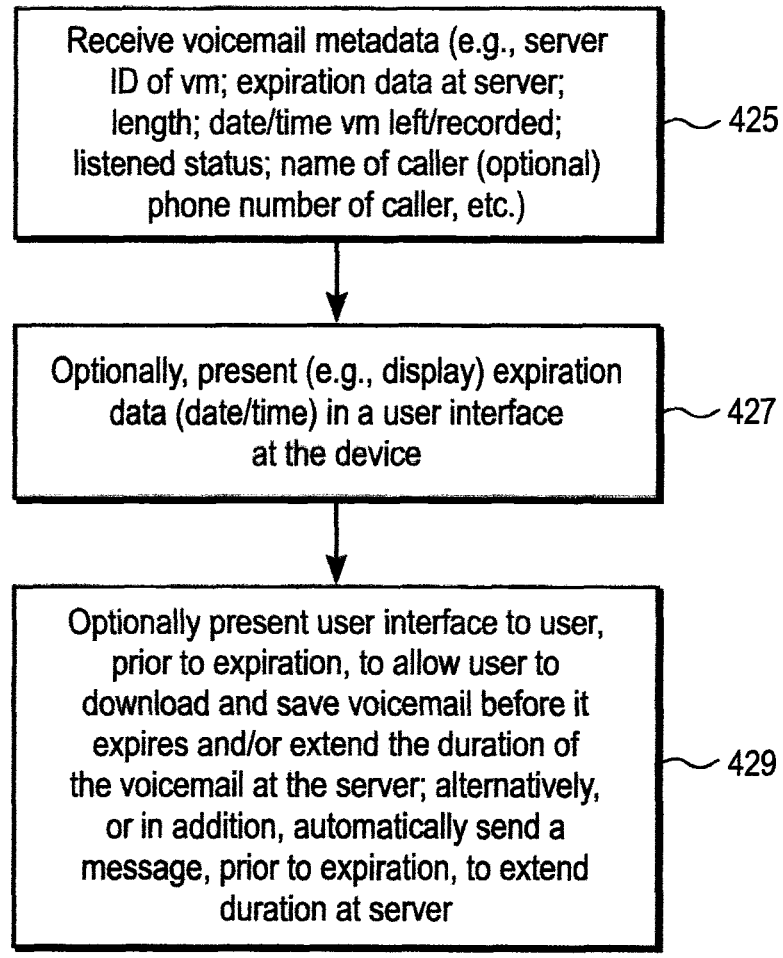
FIG. 9 is a flow chart illustrating a method according to at least certain embodiments of the present inventions.

FIG. 9 shows a method which may be used in at least certain embodiments of the present inventions. This method utilizes an expiration date for a particular voicemail in order to provide a way for a user to be notified of or to otherwise take an action with respect to, either through user interaction or by the system automatically, a voicemail before it expires. This allows the system to prevent a voicemail from being accidentally deleted or erased should its expiration date pass. In operation 425, a voicemail metadata is received at a telephone device, such as any one of the telephone devices shown in FIG. 3 which may include a data processing system 20 or 30 shown in FIGS. 2A and 2B, respectively. The voicemail metadata may include the server ID number, which is typically a unique ID number, assigned by a voicemail server, for each voicemail for a particular voicemail account, the expiration date of that voicemail, the length of the voicemail, the date and time that the voicemail was left or recorded, the list and status of the voicemail, the name of the caller, which is optional, and the phone number of the caller, if available, etc. The expiration data, which may be part of this metadata, is typically provided as a day and time, although it may be merely a day if a standardized time for deletion is established in the system. In operation 427, the expiration date or data may optionally be presented to a user in a user interface. This may occur when it is about to be deleted or at a time before deletion or in any presentation of a list of voicemails. For example, the user interface shown in FIG. 4B may include the expiration data. In certain embodiments, the expiration data may be displayed in a column and the list of voicemails may be sorted by expiration date. In addition to or as an alternative to the mere presentation of the expiration data for a particular voicemail, the system may also perform operation 429. In operation 429, an optional user interface may be presented to the user prior to expiration to allow a user to download and/or save the voicemail before it is erased. Alternatively, the user interface may give the user the ability to send the command to a voicemail server to extend the duration date of the voicemail at the server. In one embodiment, this user interface may be presented at either a predefined or dynamically generated time or at another time prior to expiration of the particular voicemail. Alternatively, or in addition, a message may be sent automatically to the voicemail server prior to expiration of the voicemail to extend the duration at the server or to cause the voicemail to be downloaded to the telephone device. It will be understood that the expiration data for a voicemail is for that particular voicemail and another voicemail will typically have a different expiration date depending upon the policies and rules of a voicemail system.

Figure 10A:
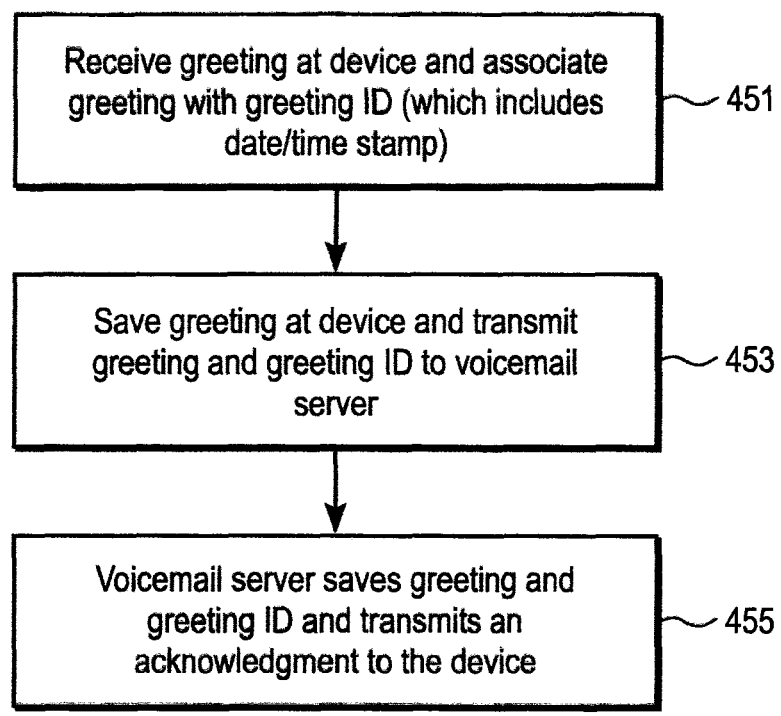
FIGS. 10A and 10B are flow charts illustrating methods according to at least certain embodiments of the present inventions.
Figure 10B:
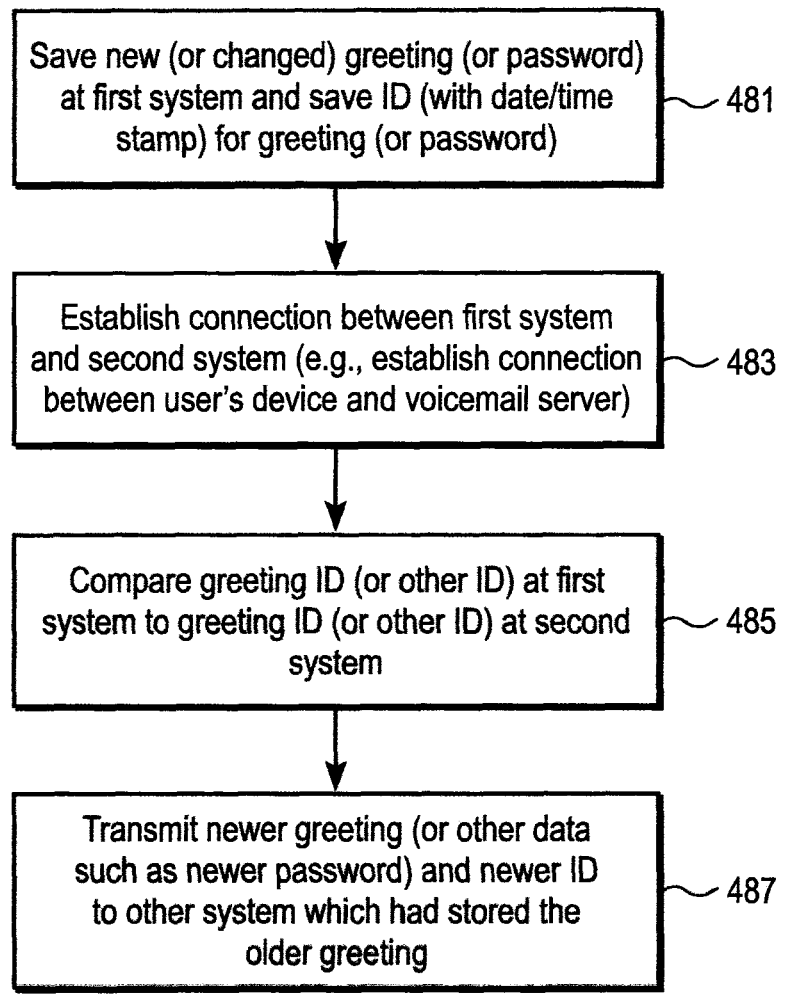

FIGS. 10A and 10B relate to another aspect of certain embodiments described herein. At least certain embodiments allow a user to set up a greeting or to change a greeting by at least two different mechanisms. For example, after initialization of a voicemail system, a user may be able to change the voicemail greeting at a telephone device which is the device for which the voicemail account has been established, or at a land line telephone or other phone having a phone number for which the voicemail account was not established. Either of such telephones could be used to call the voicemail server to change the greeting message in the voicemail system. Being able to change the voicemail greeting from a plurality of different devices may cause confusion in that a greeting stored at a telephone device for which the voicemail account has been established may be different than the voicemail greeting saved at a voicemail server. For example, if the original voicemail greeting was recorded at the telephone device for which the voicemail account exists, and then the user changed the greeting by using a different telephone device (having a phone number for which there is no voicemail account) then there are two different voicemail greetings which are stored on the two different systems. It is useful to have a way to distinguish between those greetings to determine which one is the newer greeting, as it is assumed that the newer greeting reflects the intent of the user of the voicemail account.

FIG. 10A shows a process for initializing the voicemail greeting. In operation 451, the greeting is received at the device, and a greeting ID is associated with the greeting. This greeting ID may include a date and time stamp along with the phone number of the telephone device which owns the voicemail account. This greeting is saved at the telephone device and transmitted to a voicemail server. Also, the greeting identifier (ID) is also transmitted to the voicemail server. The voicemail server, in operation 455, saves the greeting and saves the greeting ID and transmits an acknowledgement to the device. The transaction, in operation 455, may advantageously be an atomic transaction using techniques known in the art to create an atomic transaction when saving data. After initialization, the method of FIG. 10B may be employed to determine which of two saved greetings is the most current greeting which should be used on both devices. In operation 481, a new or changed greeting is saved at a first system. In an alternative embodiment, a new password may be saved at the first system. In addition, in operation 481, a unique identifier is also saved for the greeting or password. This identifier may include the telephone number of the telephone device which owns the voicemail account and may include a date and time stamp. Operation 481 may occur when the first system is not in communication with the second system. For example, operation 481 may occur when the telephone device, which owns the voicemail account, is not connected to a voicemail server. It will be understood that the first system may be either of the telephone device or the voicemail server. In operation 483, a connection is established between the first system and the second system. For example, a connection may be established between the user's telephone device, which may be any one of the telephone devices shown in FIG. 3, and the voicemail server. Then in operation 485, the identifier, such as a greeting identifier, at the first system is compared to the greeting identifier at the second system. If these identifiers match, then it shows that the two systems are synchronized with respect to the greeting. If they do not match, then the more recent greeting identifier is determined to be the correct identifier and its associated greeting is transmitted in operation 487 to the other system which has the older greeting (or older password). In addition, the identifier for the newer greeting or newer password is also transmitted to the other system which had stored the older greeting or older password. Atomic transactions, which are known in the art, may be preferred to save the greeting and/or greeting ID to make sure the transaction is completed entirely or not. By implementing the methods of FIGS. 10A and 10B, it is possible for a user to change a greeting or a password at any telephone device which can connect to a voicemail server or other voicemail infrastructure system rather than being required to change the greeting or password using only the device which owns the voicemail account (e.g. the device which initialized the account).

Figure 11:
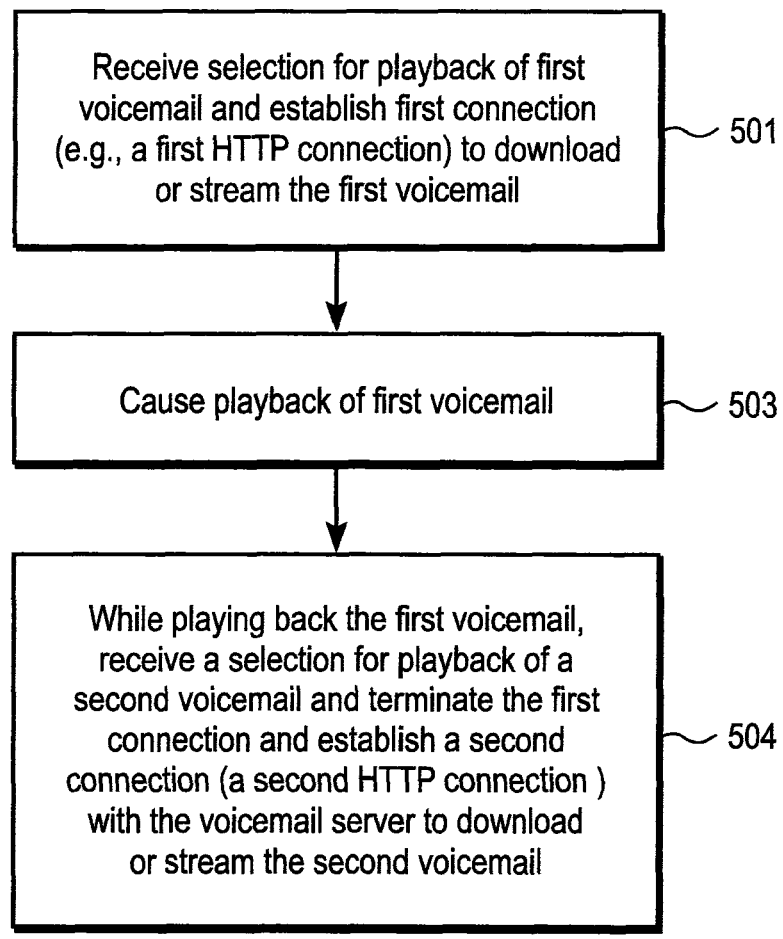
FIG. 11 is a flow chart illustrating a method according to at least certain embodiments of the present inventions.

FIG. 11 relates to another aspect of at least certain embodiments of the inventions. In this method, a voicemail server may have a constrained number of connections which it can support for a particular telephone device. This may be a rule or policy enforced by a public telephone carrier for a variety of reasons. FIG. 11 shows a method for operating within such a constrained system. In operation 501, a selection for playback of a voicemail is received and a connection for this first voicemail is established. This connection may be an HTTP connection through the Internet. The connection may be to download or to stream the first voicemail. In response to the selection, operation 503 causes the playback of the first voicemail. In addition, in operation 503, a user interface may present a list of other voicemails, allowing the user to browse and/or manipulate voicemails in the list in the user interface. In operation 504, while playing back the first voicemail, the system may receive a selection for playback of a second voicemail. In response to this selection, the system terminates the first connection and establishes a second connection, such as a second HTTP connection with the voicemail server to download or stream the second voicemail. In this case, the first connection is preempted in order to establish the second connection to playback or otherwise manipulate or access the second voicemail.

Another aspect of at least certain embodiments relates to a method for providing an address or a URL of the voicemail server to a telephone device when it is not initialized. In one embodiment, the telephone device can request the public telephone carrier which provides telephone service for the telephone device to send a SMS message to the telephone device which includes the URL of the voicemail server to allow initialization of the voicemail service. In this manner, the telephone device can be manufactured without having to store a particular URL for a voicemail server. Further, the device can be deployed for a customer without having to store that URL in the device. This also allows flexibility for a service provider, such as a public telephone carrier, which can change the URL at any point in time and still be able to provide the ability for a new device which has not been initialized to contact the voicemail server through a URL provided by the service provider, such as a public telephone carrier.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method comprising:
displaying, on a communication device, a user interface presenting a list comprising a plurality of voicemails;
receiving, by the communications device, a first selection within the displayed list, the first selection selecting a first voicemail from the plurality of voicemails;
responding to the first selection of the first voicemail by:
displaying a plurality of playback controls for the first voicemail while continuing to display at least a subset of the displayed list; and
initiating play back of the first voicemail;
receiving, by the communication device while the first voicemail is being played back, a second selection within the displayed list, wherein the second selection is capable of selecting any of the plurality of voicemails in any order, the second selection selecting a second voicemail from the plurality of voicemails; and
responding to the second selection of the second voicemail while the first voicemail is being played back by:
terminating play back of the first voicemail;
displaying a plurality of playback controls for the second voicemail while continuing to display at least a subset of the displayed list; and
initiating play back of the second voicemail;
wherein the plurality of playback controls for the first voicemail are displayed in between two voicemails of the plurality of voicemails in the displayed list.

2. The method of claim 1, wherein the plurality of playback controls for the first voicemail include a stop control, a start control, a pause control, a fast forward control, and a move in reverse control.

3. The method of claim 1, further comprising responding to the first selection of the first voicemail by displaying a time line corresponding to the first voicemail.

4. The method of claim 1, wherein the communications device is a VOIP device.

5. The method of claim 1, wherein downloading the second voicemail comprises receiving the second voicemail as streaming media.

6. The method of claim 1, wherein the user interface includes a plurality of fields for displaying metadata associated with each voicemail in the plurality of voicemails.

7. The method of claim 6, wherein the metadata associated with a respective voicemail includes at least a subset of: a name of the person who left the respective voicemail, a phone number of the person who left the respective voicemail, a date and time of the respective voicemail, a duration of the respective voicemail, and an indication as to whether the respective voicemail has been listened to previously.

8. The method of claim 1, wherein the user interface further includes a user interface element corresponding to a command for sorting the plurality of voicemails.

9. The method of claim 1, wherein the user interface further includes one or more user interface elements corresponding to one or more commands for: deleting a voicemail, saving a voicemail, forwarding a voicemail to another telephone number or voicemail server, listening to a voicemail, or moving a voicemail to a folder.

10. A non-transitory computer-readable storage medium storing one or more programs configured for execution by a communication device, the one or more programs comprising instructions for:
displaying, a communications device, a user interface presenting a list comprising a plurality of voicemails;
receiving, by the communications device, a first selection within the displayed list, the first selection selecting a first voicemail from the plurality of voicemails;
responding to the first selection of the first voicemail by:
displaying a plurality of playback controls for the first voicemail while continuing to display at least a subset of the displayed list; and
initiating play back of the first voicemail;
receiving, by the communications device while the first voicemail is being played back, a second selection within the displayed list, wherein the second selection is capable of selecting any of the plurality of voicemails in any order, the second selection selecting a second voicemail from the plurality of voicemails; and
responding to the second selection of the second voicemail while the first voicemail is being played back by:
terminating play back of the first voicemail;
displaying a plurality of playback controls for the second voicemail while continuing to display at least a subset of the displayed list; and
initiating play back of the second voicemail;
wherein the plurality of playback controls for the first voicemail are displayed in between two voicemails of the plurality of voicemails in the displayed list.

11. The non-transitory computer-readable storage medium of claim 10, wherein the communications device is a VOIP device.

12. The non-transitory computer-readable storage medium of claim 10, wherein the user interface includes a plurality of fields for displaying metadata associated with each voicemail in the plurality of voicemails.

13. The non-transitory computer-readable storage medium of claim 12, wherein the metadata associated with a respective voicemail includes at least a subset of: a name of the person who left the respective voicemail, a phone number of the person who left the respective voicemail, a date and time of the respective voicemail, a duration of the respective voicemail, and an indication as to whether the respective voicemail has been listened to previously.

14. The non-transitory computer-readable storage medium of claim 10, wherein the user interface further includes one or more user interface elements corresponding to one or more commands for: deleting a voicemail, saving a voicemail, forwarding a voicemail to another telephone number or voicemail server, listening to a voicemail, or moving a voicemail to a folder.

15. A communications device comprising:
one or more processors;
memory storing one or more programs to be executed by the one or more processors;
the one or more programs comprising instructions for:
displaying a user interface presenting a list comprising a plurality of voicemails;
receiving a first selection within the displayed list, the first selection selecting a first voicemail from the plurality of voicemails;
responding to the first selection of the first voicemail by:
displaying a plurality of playback controls for the first voicemail while continuing to display at least a subset of the displayed list; and
initiating play back of the first voicemail;
receiving, while the first voicemail is being played back, a second selection within the displayed list, wherein the second selection is capable of selecting any of the plurality of voicemails in any order, the second selection selecting a second voicemail from the plurality of voicemails; and
responding to the second selection of the second voicemail while the first voicemail is being played back by:
terminating play back of the first voicemail;
displaying a plurality of playback controls for the second voicemail while continuing to display at least a subset of the displayed list; and
initiating play back of the second voicemail;
wherein the plurality of playback controls for the first voicemail are displayed in between two voicemails of the plurality of voicemails in the displayed list.

16. The communications device of claim 15, wherein the communications device is a VOIP device.

17. The communications device of claim 15, wherein the user interface includes a plurality of fields for displaying metadata associated with each voicemail in the plurality of voicemails.

18. The communications device of claim 17, wherein the metadata associated with a respective voicemail includes at least a subset of: a name of the person who left the respective voicemail, a phone number of the person who left the respective voicemail, a date and time of the respective voicemail, a duration of the respective voicemail, and an indication as to whether the respective voicemail has been listened to previously.

19. The communications device of claim 15, wherein the user interface further includes one or more user interface elements corresponding to one or more commands for: deleting a voicemail, saving a voicemail, forwarding a voicemail to another telephone number or voicemail server, listening to a voicemail, or moving a voicemail to a folder.

* * * * *

UNITED STATES PATENT AND TRADEMARK OFFICE
CERTIFICATE OF CORRECTION

PATENT NO. : 8,909,199 B2  
APPLICATION NO. : 13/784537  
DATED : December 9, 2014  
INVENTOR(S) : Gregory Novick et al.

Page 1 of 1

It is certified that error appears in the above-identified patent and that said Letters Patent is hereby corrected as shown below:

ON THE TITLE PAGE, ITEM (71):  
Under Applicant, delete "Cuperitno," and insert -- Cupertino, --, therefor;

IN THE CLAIMS:  
At column 18, claim number 1, line number 20, delete "communication" and insert -- communications --, therefor;

At column 18, claim number 1, line number 30, delete "communication" and insert -- communications --, therefor;

At column 19, claim number 10, line number 12, delete "communication" and insert -- communications --, therefor;

At column 19, claim number 10, line number 14, delete "displaying," and insert -- displaying, on --, therefor.

Signed and Sealed this  
Ninth Day of February, 2016

Michelle K. Lee  
*Director of the United States Patent and Trademark Office*